US011750865B1

(12) United States Patent
Mekuria et al.

(10) Patent No.: US 11,750,865 B1
(45) Date of Patent: Sep. 5, 2023

(54) METHOD AND SYSTEM FOR SYNCHRONIZATION OF ADAPTIVE STREAMING TRANSCODER AND PACKAGER OUTPUTS

(71) Applicant: CodeShop, B.V., Amsterdam (NL)

(72) Inventors: Rufael Negatu Mekuria, Amsterdam (NL); Arjen Wagenaar, Amsterdam (NL); Dirk Griffioen, Arnhem (NL); Mohamad Raad, Beirut (LB)

(73) Assignee: CodeShop, B.V., Amsterdam (NL)

( * ) Notice: Subject to any disclaimer, the term of this patent is extended or adjusted under 35 U.S.C. 154(b) by 0 days.

(21) Appl. No.: 17/717,020

(22) Filed: Apr. 8, 2022

(51) Int. Cl.
*H04N 21/242* (2011.01)
*H04N 21/8547* (2011.01)
*H04L 65/75* (2022.01)
*H04L 65/70* (2022.01)

(52) U.S. Cl.
CPC ........... *H04N 21/242* (2013.01); *H04L 65/70* (2022.05); *H04L 65/762* (2022.05); *H04N 21/8547* (2013.01)

(58) Field of Classification Search
CPC ... H04N 21/235; H04N 21/435; H04N 21/242
See application file for complete search history.

(56) References Cited

U.S. PATENT DOCUMENTS 7,667,780 B2 2/2010 Weiss
7,885,340 B2 2/2011 Greenbaum et al.
9,060,201 B2 6/2015 Labrozzi et al.
9,374,604 B2 6/2016 Nemiroff et al.
9,532,099 B2 12/2016 Lawrence et al.
9,794,313 B2 10/2017 Lammers et al.
10,154,320 B2 12/2018 Labrozzi et al.
10,313,710 B1 6/2019 Karlsson et al.
(Continued)

FOREIGN PATENT DOCUMENTS

WO WO2013/144347 A1 10/2013

OTHER PUBLICATIONS

ISO/IEC 23009-1: Draft Third Edition Jul. 26, 2018 Information technology—Dynamic adaptive streaming over HTTP (Dash)—Part 1:Media presentation description and segment formats.
(Continued)

*Primary Examiner* — Hsiungfei Peng
(74) *Attorney, Agent, or Firm* — Pablo Meles

(57) ABSTRACT

A system, apparatus and method for synchronizing distributed adaptive streaming transcoders or packagers includes a plurality of distributed transcoders having one or more processors configured to perform the functions of identifying the output track timescale, identifying from an input signal a frame time information and optionally adjusting it for the output track timescale, calculating the frame time information of the frame relative to a time anchor by adjusting it with a synchronization time stamp, identifying a fixed segment duration by reading it from a memory, computing an earliest presentation time of a next media segment as an integer multiple of the fixed segment duration times the output track timescale, generating the next media segment with the fixed segment duration and the earliest presentation time of the next media segment, and transmitting the next media segment using an HTTP Request or a receiver.

18 Claims, 11 Drawing Sheets

(56) References Cited

U.S. PATENT DOCUMENTS

| | | | |
|---|---|---|---|
| 10,412,695 B2 | 9/2019 | Dang et al. | |
| 10,454,604 B2 | 10/2019 | Elliot et al. | |
| 10,652,625 B1 * | 5/2020 | Saxton | H04N 21/8547 |
| 10,979,784 B1 * | 4/2021 | Mekuria | H04N 21/8456 |
| 11,057,633 B2 | 7/2021 | Syed et al. | |
| 11,063,999 B2 | 7/2021 | Bomfim et al. | |
| 2013/0124749 A1 * | 5/2013 | Thang | H04L 65/613 709/231 |
| 2018/0176278 A1 * | 6/2018 | Mandyam | H04L 65/70 |
| 2018/0288500 A1 * | 10/2018 | Stockhammer | H04N 21/23614 |
| 2019/0036803 A1 * | 1/2019 | Kumar | H04L 43/106 |
| 2022/0191584 A1 * | 6/2022 | Toullec | H04N 21/812 |
| 2022/0321945 A1 * | 10/2022 | Allen | H04N 21/25841 |

OTHER PUBLICATIONS

ISO/IEC 14496-12: Fifth edition Dec. 15, 2015 Information technology—Coding of audiovisual objects—Part 12: ISO base media file format.

ISO/IEC 23000-19:2018 Information technology—Multimedia application format (MPEG-A)—Part 19: Common media application format (CMAF) for segmented media.

* cited by examiner

100

400

Computer/client

500

700

800

900

DASH Example

```
<MPD
 xmlns:xsi="http://www.w3.org/2001/XMLSchema-instance"xmlns="urn:mpeg:dash:schema:mpd:2011"
 xsi:schemaLocation="urn:mpeg:dash:schema:mpd:2011 http://standards.iso.org/ittf/PubliclyAvailableStandards/MPEG-DASH_schema_files/DASH-MPD.xsd"
 type="dynamic" availabilityStartTime="1970-01-01T00:00:00Z" publishTime="2022-02-21T13:22:39.799801Z" minimumUpdatePeriod="PT2S" timeShiftBufferDepth="PT5M"
 maxSegmentDuration="PT2S" minBufferTime="PT10S" profiles="urn:mpeg:dash:profile:isoff-live:2011">
 <Period id="1" start="PT0S">
  <AdaptationSet id="1" group="1" contentType="audio" lang="en" minBandwidth="64000" maxBandwidth="128000" segmentAlignment="true" audioSamplingRate="48000"
   mimeType="audio/mp4" codecs="mp4a.40.2"startWithSAP="1">
   <AudioChannelConfiguration schemeIdUri="urn:mpeg:dash:23003:3:audio_channel_configuration:2011" value="1" />
   <Role schemeIdUri="urn:mpeg:dash:role:2011" value="main" />
   <SegmentTemplate timescale="48000" initialization="live-$RepresentationID$.dash" media="live-$RepresentationID$-$Time$.dash">
    <!-- 2022-02-21T13:17:36Z / 1645449456 - 2022-02-21T13:22:37.440000Z -->
    <SegmentTimeline>
    </SegmentTimeline> </SegmentTemplate>
   <Representation id="audio_eng=64000" bandwidth="64000">
   </Representation>
   <Representation id="audio_eng=128000" bandwidth="128000"> </Representation>
  </AdaptationSet>
  <AdaptationSet id="2" group="2" contentType="video" par="16:9" minBandwidth="500000" maxBandwidth="1000000" segmentAlignment="true" width="1280" height="720"
   sar="1:1" frameRate="25" mimeType="video/mp4" codecs="avc1.42C01F" startWithSAP="1">
   <Role schemeIdUri="urn:mpeg:dash:role:2011" value="main" />
   <SegmentTemplate timescale="600" initialization="live-$RepresentationID$.dash" media="live-$RepresentationID$-$Time$.dash">
    <!-- 2022-02-21T13:17:36Z / 1645449456 - 2022-02-21T13:22:37.440000Z -->
    <SegmentTimeline>
      <S t="987269673600" d="1152" r="15" />  <!– optional →
    </SegmentTimeline>
   </SegmentTemplate>
   <Representation id="video=500000" bandwidth="500000" scanType="progressive">
   </Representation>
   <Representation id="video=1000000" bandwidth="1000000" scanType="progressive">
   </Representation>
  </AdaptationSet>
 </Period>
 <UTCTiming
  schemeIdUri="urn:mpeg:dash:utc:http-iso:2014"
  value="https://time.akamai.com/?iso" />
</MPD>
```

1004

1005

CMAF Media Segment example

1100

METHOD AND SYSTEM FOR SYNCHRONIZATION OF ADAPTIVE STREAMING TRANSCODER AND PACKAGER OUTPUTS

CROSS-REFERENCE TO RELATED APPLICATIONS

Not applicable.

STATEMENT REGARDING FEDERALLY-SPONSORED RESEARCH OR DEVELOPMENT

Not applicable.

INCORPORATION BY REFERENCE

Not applicable.

FIELD

The teachings in accordance with the exemplary embodiments relate generally to streaming media, and more particularly to the distributed adaptive streaming transcoder and packager output track synchronization for the generation of streaming media content.

DESCRIPTION OF THE RELATED ART

This section provides a background or context to the various embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Content, in digital format is increasingly popular. Users are often downloading or streaming such content from a remote service. Internet protocol video delivery using an Adaptive Streaming protocol provides many advantages over traditional delivery. It can be used to implement live, catch-up and on-demand services and reach devices with different network connectivity properties and operating in different conditions such as in mobile networks.

Because different client devices require the content to be in specific formats and-or bit-rates/qualities, the remote service will often perform tasks such as video encoding, packaging and generating MPEG-DASH, HTTP Live Streaming and Common Media Application Format Media presentations that are made available for adaptive streaming over HTTP(S). Example formats generated include MPEG-DASH as defined by ISO/IEC in 23009-1 and HTTP Live Streaming published by the Internet Engineering Task Force as RFC 8216 or Smooth streaming published and maintained by Microsoft corporation or the Common Media application format defined by ISO/IEC 23000-19. Each of these formats provide the benefits of adaptive streaming delivery and rely on adaptive streaming transcoders and packagers to generate the target output formats for adaptive streaming. Remote services may be composed of various streaming components including adaptive streaming transcoders and packagers. A key functionality is the generation of representations of different qualities and segmentation into individually downloadable segments, herein referred to as adaptive streaming packaging and transcoding. The output can be output tracks that combine initialization segments and media segments into an ISO-BMFF compliant file or byte stream, also referred to as ISO-BMMF track, or herein referred to as output track.

Such a remote service may be implemented in a distributed manner. Such distributed components are deployed on server hardware that exists on premise or in cloud-based servers and include one or more distributed encoder/transcoder and packager entities that jointly create the media streaming presentation representing a live program feed. In such scenarios the distributed encoder/transcoder creates the adaptive bit-rate encoding and the packager may be used to generate the output tracks as a combination of initialization segments and media segments.

Examples of cloud service providers include AWS EC2 provided by Amazon web services, Google cloud, Microsoft Azure, Alibaba cloud or Tencent cloud. Also, more cloud services offered by smaller providers are becoming available rapidly, and these may be used to implement the techniques described herein. Such privately or publicly hosted clouds can be offered based on cloud operating systems such as provided by organization such as OpenStack foundation or VMWare or other providers of cloud operating system and virtualization technologies. Cloud operating systems may use various virtualization technologies including container-based approaches and hypervisor-based virtualization to offer instances for distributed deployments. This gives a lot of flexibility to service offerings enabling them to deploy one or more instances with different sizes on different containers flexibly based on the actual resource demand.

In conventional approaches, upstream content generators provide the sources to transcoders and will place time-stamps (timing information) corresponding to the video frames. Adaptive Streaming transcoders, transcode the content to different representations with different bit-rates and segment boundaries, which should enable seamless switching between representations. The segment boundaries are placed and represented by an earliest presentation time (EPT) corresponding to the presentation time of the first sample in a segment. This earliest presentation time is often referred to as the segment boundary and can be used to download the segment in time and play it back in time to avoid a re-buffering or a delay when presenting the content of a media segment.

Systems can detect these segment boundaries before the media segment is rendered or downloaded for playback as it is usually signaled in the manifest presentation description, playlist or index segment, both of these are downloaded before the actual media content is downloaded. Based on such timing information, download time estimation and bit-rate switching can be applied in order to select the best segment for download. In the case of distributed transcoding or encoding, different distributed components may use different presentation timestamps for frames and different earliest presentation times (EPT) for segments, and sometimes even different presentation time stamps for corresponding media frames. This results in the fact that segments generated by different transcoders are not interchangeable in media presentations such as those based on HTTP Live Streaming, smooth streaming, MPEG-DASH or Common Media Application Format, and that inter-changeable usage will introduce playback errors and glitches, as timeline discontinuities and visual discontinuities will occur when packager or encoder synchronization are not applied. This problem is referred to as encoder and/or packager synchronization.

This problem breaks and hinders generation of such segmented adaptive streaming content in highly available systems as required in many cases, where more than one encoder/packager are used to generate the output tracks and media presentations. In these setups redundant encoder/packager, origin and content delivery networks are used in order to guarantee operation of the service in case 1 of the subcomponents in the chain fails.

In such highly available systems multiple transcoders, packagers and origins may fail and re-join again. In this case the fact that segments are not interchangeable is problematic. Therefore, the adaptive streaming transcoder and packager synchronization is a challenging and relevant problem to enable highly available and highly redundant adaptive streaming systems. Approaches have been introduced where distributed adaptive streaming transcoders are synchronized based on sharing timing information from a master encoder or transcoder with other slave encoders, these encoders use information from the master encoder to align segment boundaries, frame presentation, earliest presentation times. However, these do not offer some of the features required for highly available systems such as stateless operation, fast re-join and retransmission to add a new transcoder instance after an instance has failed. When using a master transcoder, when this master fails or leaves a session, and this would require a scheme to assign a master transcoder and a process for slave transcoders to join a session. Therefore, in many practical cases such an approach may not meet the requirement of practical highly available setups for over-the-top streaming based on popular formats such as HTTP live streaming, MPEG-DASH, smooth streaming and the common media application format.

In over-the-top (OTT) streaming, Internet connectivity is often available, opening up other opportunities for synchronization instead of common approaches such as based on the global positioning system(GPS), such as based on the Network Time Protocol (NTP) defined by the Internet Engineering Task Force in RFC 5905. To enable encoder synchronization in OTT different approaches were presented and disclosed in the past. For dual encoder synchronization an approach was presented for encoder synchronization in the AWS live media services based on output locking (Demuxed 2019 and) in elemental live. In this case encoders have a communication path to align segment start and end times and the content trying to account for drifts and clock skews. The method shows that glitches are mitigated when switching between encoder signals, and that methods for periodical communication between encoders and discovery of new/leaving encoders are needed. The method does requires maintenance of the state of other encoders in a pool to enable the adaptive streaming transcoders to be aware of de-synchronization and communication between encoders/packagers.

Alternate work goes in a lot of depth of achieving synchronization between distributed encoder chips and chassis (servers), when encoders produce MPEG-2 TS and use standardized signals to mark segment boundaries that need to be aligned across output groups for ABR representations using the OpenCable™ Specifications Encoder Boundary Point Specification OC-SP-EBP-I01-13011 EBP The approach also takes acquisition delay of the signal and network delay from the NTP server into account. What seems to add complications is that in MPEG-2 TS discontinuities can occur when the 33 bits PTS timestamp overflows. The approach, similar to the previous work, also assumes a master encoder that determines the configuration and distributes UTC times matching corresponding PTS times to slave encoders, thus a communication path between encoders needs to be available to achieve this. In this case it is unclear what would happen for example if the master encoder would fail and leave the session, as the timing reference would be lost.

SUMMARY

Techniques for synchronizing output tracks of distributed adaptive streaming transcoders and packagers are disclosed. Disclosures includes synchronization of output tracks from geographically and physically distributed transcoders and packagers, as well as synchronized generation of output tracks generated between processes or threads of a multi-threaded or multi-process transcoder or packager system. The techniques are suitable for generating synchronized and segment aligned tracks of video, audio, timed text and subtitles, thumbnails and timed metadata and other media. The technique targets popular content formats based on MPEG-DASH, HTTP Live Streaming, Common Media Application format and the ISO Base Media File Format. The techniques are particularly suitable for transcoding in a distributed environment of such popular adaptive streaming formats as the approach enables seamless switching and interchange of content segments generated by different distributed transcoder processes generated at different bitrates. In particular, by using a fixed time anchor and by relying on common input to distributed transcoders synchronization of tracks and output is realized. These techniques can be used to implement highly available and highly redundant streaming head-ends without the need of a communication channel and communication messaging between distributed transcoders or packagers. The fact that no communication channel between distributed transcoders or packagers is required makes the methods and systems disclosed more suitable for deployment in highly available systems and actual cloud-based services.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 10 illustrates the example of an MPEG-DASH manifest generated by preferred embodiments of the disclosed invention as a synchronized output track;

DETAILED DESCRIPTION

Figure 5:
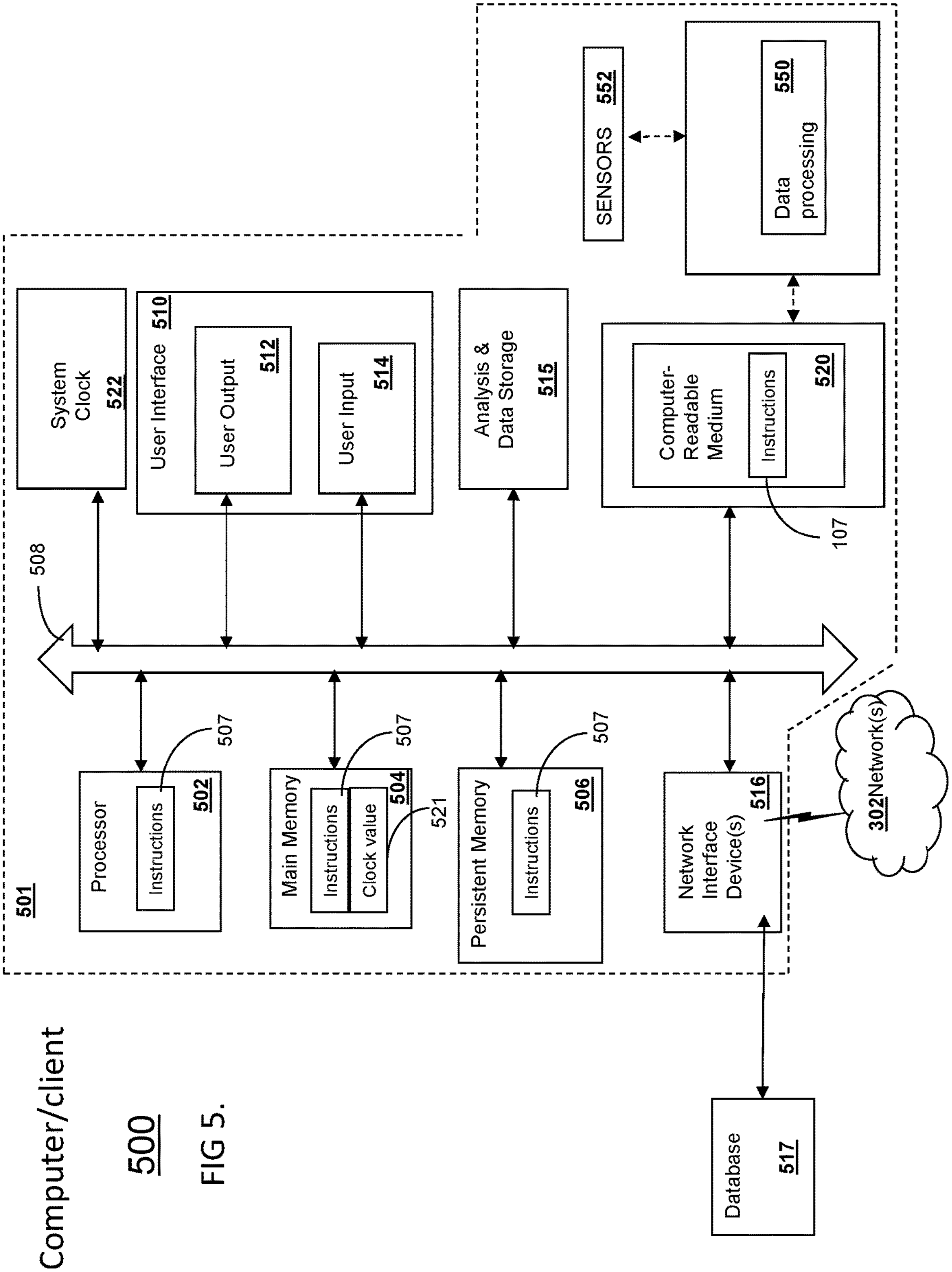
FIG. 5 illustrates an example computational architecture for implementing the method disclosed in accordance with the embodiments.

Disclosed herein are techniques to generate synchronized media streaming track output using protocols such as MPEG-DASH and HTTP Live Streaming ISO-BMFF or common media application format or smooth streaming, using a plurality of adaptive streaming encoders/transcoders and packagers. This includes techniques to achieve segment boundary alignment in the output tracks and techniques to derive output media segments and their earliest presentation time. The techniques also disclose how to align video streams with different input timing information. Embodiments teach how a plurality of adaptive streaming transcoders can be used to generate synchronized and media segment boundary aligned output tracks using a method called EpochSegmentSynch. Using EpochSegmentSynch, the distributed adaptive bit-rate transcoders produce output tracks with different qualities and/or bit-rates that may be used for seamless switching. Disclosed are techniques to implement the method in hardware or software and computational architectures as illustrated in FIG. 5.

Adaptive Streaming uses HTTP or HTTP over TLS as primary transport protocol and this enables re-using the existing Internet infrastructures for content delivery. To achieve the quality and scale matching that of linear broadcast, distribution chains need to be designed with fault tolerance and redundancy in mind. This frequently requires running multiple redundant adaptive streaming transcoders/packagers in parallel. Adaptive streaming transcoders/packager take an input signal, usually in a single quality representation and convert it to one or more different bit-rate/quality representations and segment it into individually accessible media segments.

Adaptive Bit-rate encoders, also herein referred to as adaptive streaming transcoders, are responsible for transcoding the content to different bit-rates and qualities.

This can be from an input deliver in a single compressed or uncompressed format, e.g. such as uncompressed HD-SDI etc, or a compressed stream such as based on MPEG-2 Transport stream. Adaptive streaming transcoders are used to transcode these compressed or uncompressed input to different outputs with different qualities (resolutions, bit-rates etc.).

The next step, referred to as adaptive streaming packager may include generating one or more ISO-BMFF compliant tracks composed of one or more media segments, and related media playlists and/or MPEG-DASH manifests. In this case the term adaptive streaming transcoder/packager may be used to refer to a component that implements both functionalities of transcoding and packaging to a streaming output format. In practice, such components are often deployed to enable a direct conversion of an input to one ore more adaptive streaming formats.

Common popular compression formats for video include MPEG-4 part 10/AVC or H.264, HEVC or HEVC/H.265 and MPEG VVC or H.266 and other video codecs such as AV1 developed by the alliance for open media (AOM) or AVS3 developed by the AVS consortium. The invention is not limited to video codecs, and applies equality, to other media content types. As long as the bit-streams generated by audio or other codecs provide stream access points that allow independent decoding of the frame without knowledge of prior frames, such as instant decoder refresh frames or similar, in frames that can serve as the segment start, audio, timed text and metadata can also be used with the disclosed techniques for stream synchronization. In fact, as audio tracks, timed text tracks and metadata tracks usually have random access on each sample carried in an output track, and no dependencies between samples exist, thus the techniques of segmentation can be applied to such non-video tracks in a straight forward manner most of the time.

For audio many alternative output codec formats such as MPEG-4 AAC, Dolby and others exist. A recent trend in audio codecs is that each audio frame/ISOBMFF sample is independently decodable, but that such a frame/ISO-BMFF samples may contain multiple audio samples for playback. In this case frames carried in ISO-BMFF samples can always be used as segment boundary (segment earliest presentation time). The method disclosed herein can be used for different formats that can be encapsulated in fragmented ISO BMFF, ISO-Base Media File Format files, as defined in ISO/IEC 14496-12 or the common media application format ISO/IEC 23000-19. The formats include audio, video, timed text, image tracks, thumbnail tracks or timed metadata tracks.

Adaptive streaming transcoders can be implemented in various ways using dedicated hardware or graphics processor units (GPU's) or using common general-purpose hardware and information processing systems as shown in FIG. 5 and software. A popular software encoding tool to implement techniques and codecs is the commonly used FFMpeg toolset that is available as an open-source package. This package includes many of the popular audio and video formats and codecs available for implementation.

In the case of multiple adaptive streaming transcoders being run in parallel, the different distributed transcoders need to produce content with synchronized frame timestamps and segment boundaries. This is to make sure that a client or player receiving the streams can switch seamlessly between representations, or a receiver, such as a content delivery network, packager/origin or other entity can switch seamlessly between the media segments. This is required in the case the adaptive streaming head-end comprises multiple transcoders and/or packagers, and a receiver may switch between representations generated by different distributed transcoders/packagers. In preferred embodiments this is used for creating a highly available head-end where redundant (more than one) transcoders or packager can be used inter-changeably and output segments that can be used inter-changeably by clients for playback or can be used inter-change-ably downstream such as in a content delivery network. However, achieving such synchronization in practice is not trivial. This is referred to as the problem of encoder and/or packager synchronization and applies to MPEG-DASH presentations, HTTP Live Streaming presentations and/or Common Media Application Format presentations. The requirements and problems have been described by the MPEG standardization organization WG 3 that is part of ISO/IEC JTC1 SC29. The industry requirements for transcoder synchronization have been developed as this problem is of great relevance to the industry and supporting documents with requirements and use cases for encoder and packager synchronization have been published by the MPEG standardization organization. Techniques and methods to solve this problem beyond the state of the art are solicited by the MPEG organization.

A key technique in practice is inter-encoder synchronization, i.e. to synchronize different distributed encoders or transcoders. By having more than one encoder producing identical and aligned segments redundant setups can be realized, as it is possible to use the output from the different encoders interchangeably. In such setups, failures of one encoder, e.g. due to hardware or software failures or input loss to the adaptive streaming transcoder can be mitigated downstream by switching to the signal of a redundant adaptive streaming transcoder. To avoid glitches or transitions when moving to the redundant encoder signal inter-encoder synchronization is required, as slight offsets in frames and or time stamps may result in glitches of small discontinuities.

A related problem, sometimes referred to as packager synchronization considers producing the interchangeable streaming manifests or playlists from different distributed sources, such as packagers or encoders. In practical systems, encoders, packagers and origins are separate entities in a distributed workflow. This facilitates the scale and fault tolerance required by such setups but makes it a challenge to produce manifests that can be used interchangeably by different players. For example, a timeline cannot be changed retro-actively and already announced segments cannot be removed from the manifest retro-actively as this would confuse clients trying to continuously playback a presentation. In addition, segment availability should be consistent across manifests in order to avoid erroneous requests and playback.

Also, a discontinuity introduced in one manifest must also be present in another version of the manifest generated by a different packager node to be consistent. These restrictions might be slightly different depending on the content or protocol format that is used.

Some existing solutions sometimes support inter-encoder and packager synchronization, but these may not match common requirements from broadcaster or content operators. For example, often, it requires a communication channel between the entities which may not scale well in practical distributed and stateless head-ends with high availability. The embodiments herein disclose an approach that does not require such communication paths. The disclosed approach based on EpochSegmentSynch is both broadly applicable and scalable.

Figure 1:
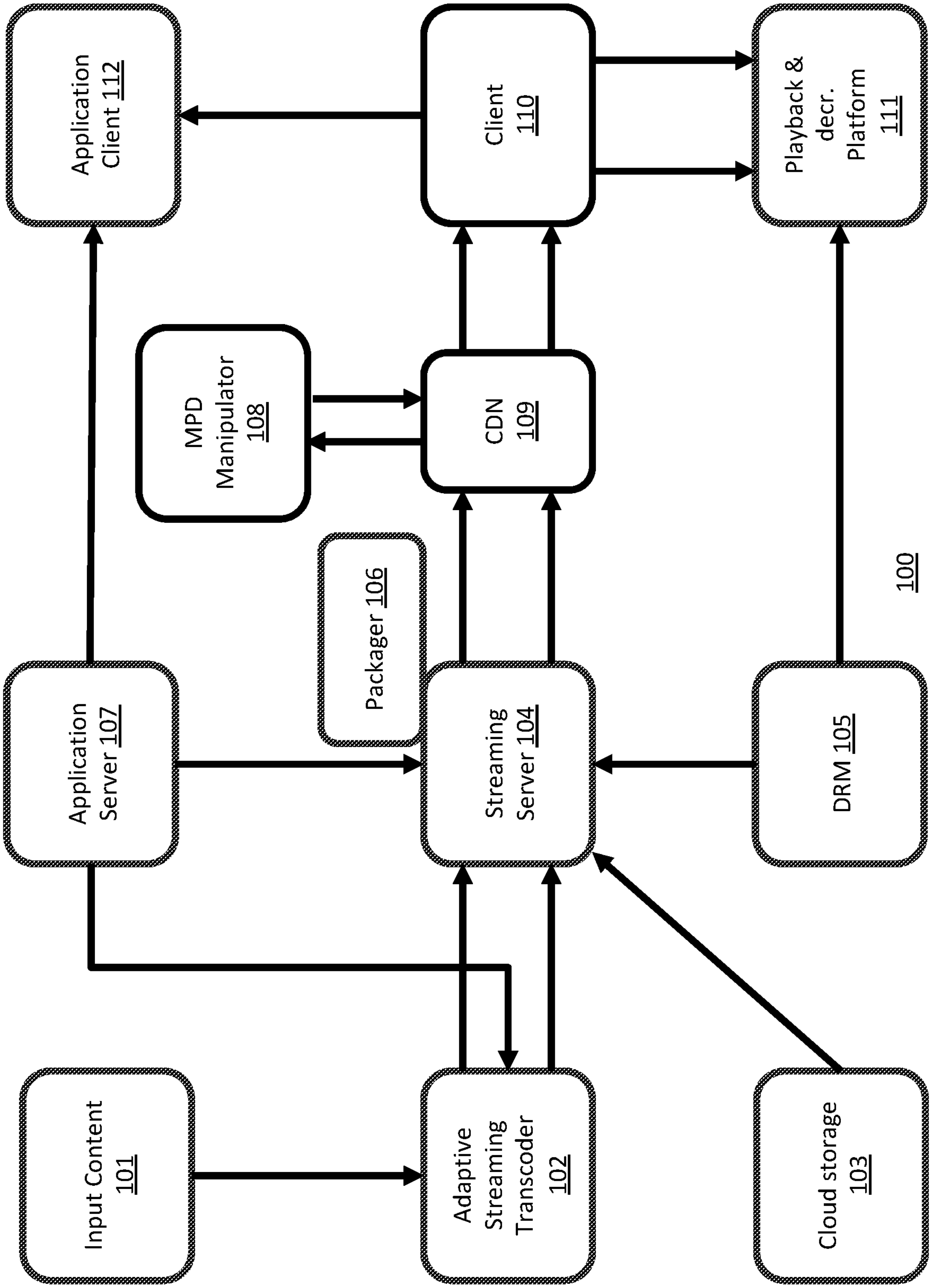
FIG. 1 illustrates an example computational architecture for implementing a client device for receiving and requesting adaptive streaming segments, or resources used to deploy adaptive streaming packaging and encoding systems in accordance with the embodiments.

To understand better the aspects of interoperability in the OTT Head-end we introduce the reference architecture of streaming head-ends developed in the DASH Industry Forum to illustrate the typical components in a testbed. The DASH-Industry forum is an organization committed to accelerate the adoption of MPEG-DASH, but some of its work is generally applicable to HTTP Streaming solutions and Head-Ends. Initial work focused on implementation guidelines using DASH with related codecs and use cases resulting in the most recent version of the DASH-IF Interoperability Guidelines 4.3. In recent years, the DASH Industry forum has done more work on the interoperability aspects in the OTT Head-end and developed a reference architecture 100, a simplified view of which is shown in FIG. 1, the packager and origin functions are combined in this schematic, these can also be separated. The architecture includes components such as ABR encoder also referred herein as the adaptive streaming transcoder 102 that is the entry point to an adaptive streaming head-end 101, the streaming origin server 104 that combines packager 106 and origin functions, (this could also be split up in two different entities) the content delivery network (CDN) 109 and Digital Rights Management (DRM) systems (105) that are present in most OTT head-ends and defines the commonly used interfaces. Most services that generate adaptive streaming content, especially for live channels, will include one or more adaptive streaming transcoders (ABR transcoders) and one or more streaming servers or packagers and one or more content delivery networks. The DASH-IF reference model does not disclose, how one or more adaptive streaming transcoders can be deployed in parallel or how they can be deployed jointly.

In addition, the model of an adaptive streaming client 110 using reference playback 111 is included in FIG. 1, the reference playback platform 111 is used to playback the actual media segments downloaded by the adaptive streaming clients. Example implementations of such reference playback platform include MSE/EME platforms developed by W3C and available in browsers and in some television devices. The OTT (Over-the-Top) Head-end is typically started by input of content or signals to one or more ABR encoders or adaptive streaming transcoders, such inputs may be based on some common contribution or broadcast formats. For interfacing between the adaptive streaming transcoder to the streaming origin server the DASH-IF defined the live media ingest protocol which uses HTTP POST or PUT method to transmit media objects. To exchange key information server side the DASH-IF developed content protection interchange (CPIX), an XML based format used in API's that are commonly supported by different DRM vendors. In some workflows, instead of adaptive streaming transcoders, stored content, may be used as input to the OTT Headend, in this case the use cases may apply to using multiple storage backends interchangeably. The method disclosed here teaches how multiple adaptive streaming transcoders can be synchronized to push to a streaming server, in preferred embodiments, using the DASH-IF media ingest protocol or a related protocol for transmitting media segments. Also, the techniques disclosed herein help in implementing the DASH-IF reference architecture for streaming when using more than one ABR encoder as entry point.

Requirements for encoder and packager synchronization exist that are common to implementors of such workflows and documented in MPEG in the requirements for encoder and packager synchronization. These requirements are met by the techniques disclosed in the embodiments herein. We briefly describe these requirements to teach how the disclosure in this document can help address these requirements.

The target goal for relevant use cases is to enable redundant encoder setups using potentially different and potentially time delayed input signals to the adaptive streaming transcoder. It should also work without strict system clock synchronization (+−100 ms) such as available on common computing systems such as available in cloud-based services. Clock values 521 can be stored in the main memory of computing systems or in a dedicated system clock 522. Distributed computing systems will typically have a skew up to around 100 milliseconds. The disclosed techniques work even in case the clock values or system clock on distributed systems is within 100 milliseconds given that the time between segment boundaries is larger than 100 milliseconds (as also required in the Common Media Application format).

Information processing systems such as illustrated in FIG. 5 include an explicit communication between encoders/transcoders or packagers (3), via the Network 302. While the network 302 is available, a protocol for exchanging encoder synchronization information is non-trivial, hence the technique disclosed here does not require the network 302 to be used for information exchange between the distributed transcoders. A protocol that does not require communications between adaptive streaming transcoders is preferable as it is easier to deploy it in practice as it can be used easily in case of failing and leaving transcoders and newly (re-) joining transcoders.

The method and system in the embodiments herein disclose how to support failing and leaving/joining encoders/receivers and the distributed encoding of bit-rate ladders and redundant encoding of bit-rate ladders using adaptive streaming transcoder. Specifically, the method of FIG. 8 details how to operate in case of a device failure.

Figure 9:
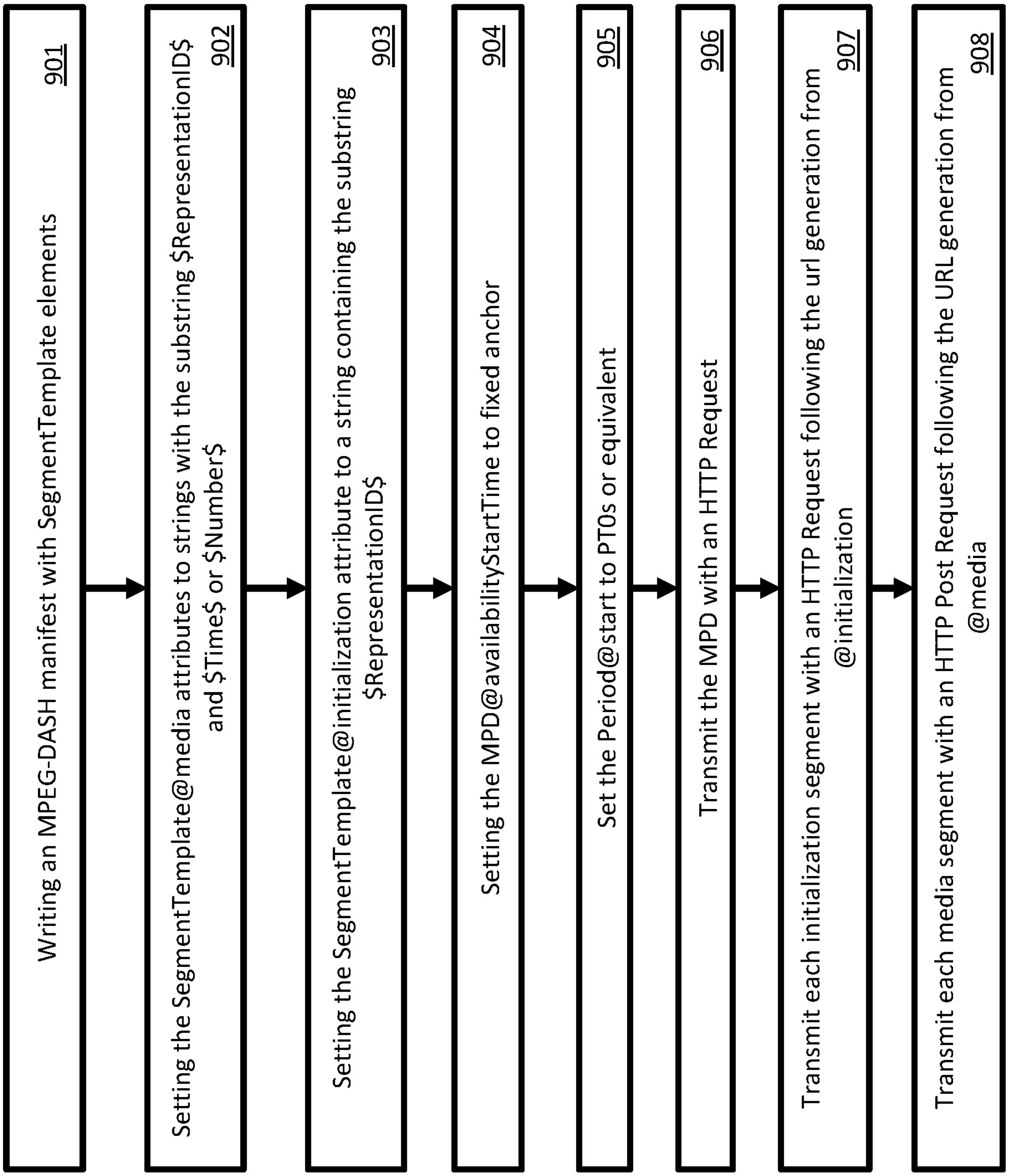
FIG. 9 illustrates the steps involved for distributed transcoder output synchronization in preferred embodiments where the generated output includes an MPEG-DASH manifest.
Figure 11:
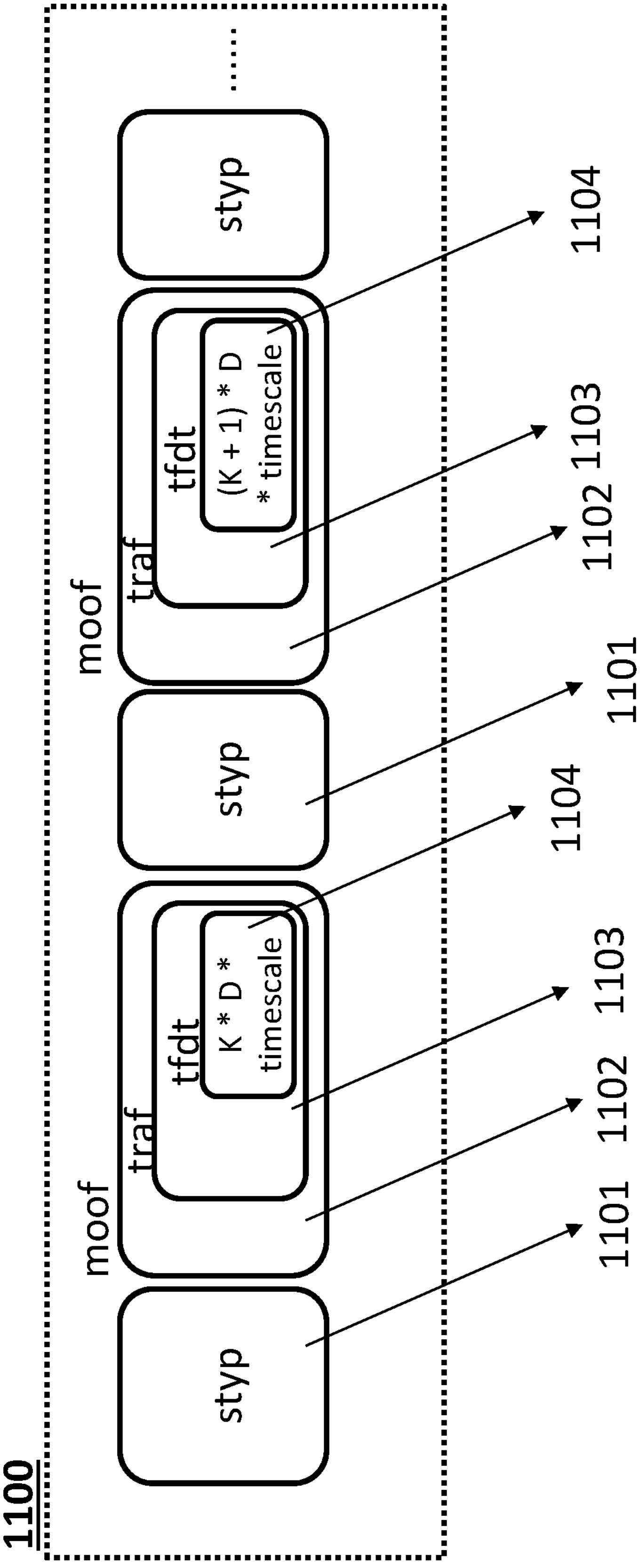
FIG. 11 illustrates the example of a Common Media Application Format track generated in preferred embodiments of the disclosed invention as a synchronized output track.

Also, common MPEG standards need to be supported such as the MPEG ISO Base Media File Format ISO/IEC 14496-12, MPEG-DASH ISO/IEC 23009-1, the Common Media Application Format (CMAF) defined in ISO/IEC 23000-19 etc. and without requiring proprietary extensions or externally defined semantics such as based on UUID box. The UUID box defined in ISO Base media file format allows proprietary extensions and box types that can be identified by a unique identifier based on a UUID, this has led to some adoption by manufacturers to implement specific features, but usage of these boxes is not preferred for maximum interoperability, Example output from distributed transcoder or packager is shown in FIG. 9, FIG. 10, and FIG. 11 illustrating examples using the MPEG-DASH format, the HTTP Live Streaming format and the Common Media application format (CMAF) example. Examples using other formats such as smooth streaming or MPEG media transport could use similar formats. The support for common formats is expected to enable broader and quicker adoption.

Algorithms for enabling synchronization of content without explicit timing information can also be used with the system and methods disclosed in the embodiments herein by using techniques for alignment of media streaming content. In case input signal or content inserted to different distributed adaptive streaming transcoders do not contain shared timestamps, one way to enable synchronization is by detecting embedded markers in the media streams in such cases the original feed has markers that encode timestamps. Another approach would be to synchronize based on image and/or stream program information. For example, one could exchange features combined with playback timestamps, and by using such features, synchronize the timestamps of the different inputs. Another option would be to synchronize through other markers in the bit-stream that may be present such as based on SCTE-35 markers that contain timing information. Such techniques for frame time are refined as stream synchronization method herein.

Stream synchronization methods would still require a master encoder to be chosen which is the encoder that other encoders need to synchronize towards and use as a reference.

The disclosed embodiments also enable the synchronization of timed metadata segments, timed text segments in a consistent manner by using fixed duration segments relative to a fixed time anchor reference. Generating constant duration segments can be achieved for metadata and timed text by introducing sample boundaries, and repeating a metadata sample or timed text element or cue in a next sample.

The output track of the system and method disclosed also support commonly accepted output formats such as the Common Media Application Format, MPEG-DASH or HTTP Live Streaming. This is because media and initialization segments as defined in MPEG-DASH are used following constraints from the Common Media Application Format for CMAF media segments and headers that can be referenced in MPEG-DASH or HTTP Live Streaming manifest and/or playlists. Timed text media segments follow the formatting as defined in ISO/IEC 14496-30 and timed metadata could be formatted in CMAF tracks using ISO/IEC 23001-10 or ISO/IEC 23001-18 event message track, or a general timed metadata track as described in ISO/IEC 14496-12 section 12.3.

For packager synchronization, additional requirements exist as in this case the manifests or playlist also need to full-fill certain requirements to enable consistent playback by players requesting these manifests or playlists. These include generating consistent manifests or playlists without retro-active changes to the timeline that can be played consistently and interchangeably. Further, different framerates including non-integer frame rates need to be supported. Also, the redundant approach should not require features not commonly present features on clients that support at least MPEG-DASH and HTTP Live Streaming protocols. With the disclosed embodiments it is also possible to generate an interoperable streaming manifest based on MPEG-DASH or HTTP Live Streaming that can be used interchangeably as example shown in FIG. 10.

Figure 2:
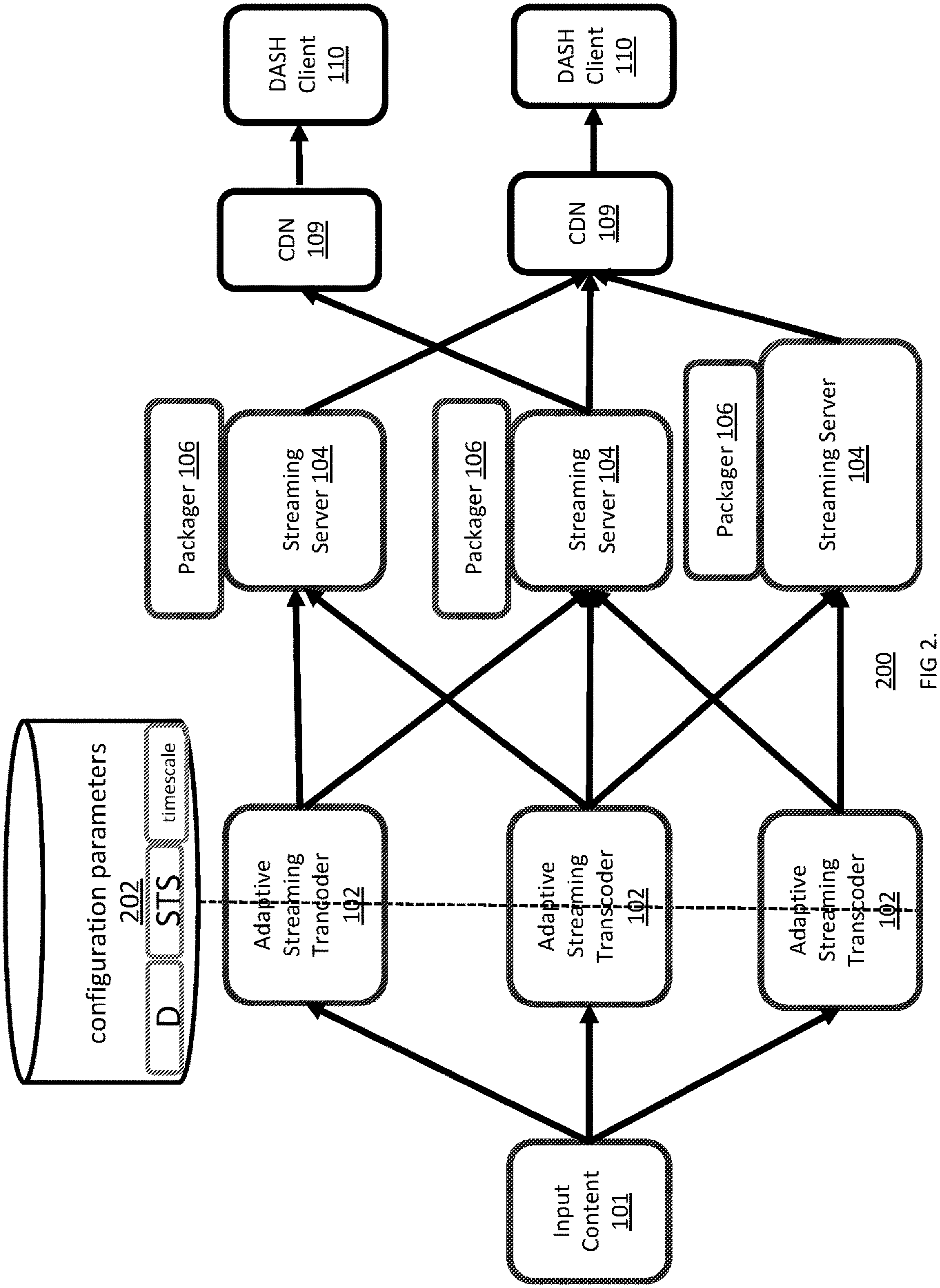
FIG. 2 illustrates an example computational architecture to deploy a plurality of redundant Adaptive Streaming Encoders, packagers and origins in relation with the embodiments.

FIG. 2 shows the schematic architecture that could be used in case of an implementation of the disclosed embodiments. Multiple adaptive streaming transcoders 102 are transmitting their output tracks to one or more distributed origin/packager servers (104 and 106). The distributed adaptive streaming transcoders are expected to use a common input signal 101 or an input with common per frame timing information. If this is not the case, a synchronization timestamp (STS) may be configured that maps the input timestamps to output timestamps. In some cases, and some embodiments, an alternative way to carry information relating the synchronization time stamp may be conveyed in different ways as an encoder/transcoder configuration. For example, it could be embedded in the input bitstreams or as SEI (supplemental enhancement information), in SCTE-35 or SCTE 104 markers etc. To the extend of implementing the disclosed invention such alternate ways of disclosing information relating to the synchronization timestamp that is used to compute the relative timing offset from a UTC timeline origin based on a common reference, are not precluded.

Thus, the difference between the time anchor and relative timing and the timing in the source signal is provided in this STS value or conveyed in an alternative way. If no such information is available, as mentioned before, an alternative method would be needed to synchronize the stream inputs first, i.e. a stream synchronization method. Also, the timescales for different media types should be configurable to allow frame accuracy and avoid rounding errors when a mismatch with the input timescale occurs. In general, it is preferred to use a timescale for the segments that is an integer multiple of the input timescale in order to avoid rounding errors when converting.

In case no consistent timing in input frame timestamps exists, methods such as cross checking of features such as in the image domain (e.g. color histograms), or in the compressed domain (transform coefficients etc.) could be used by a stream synchronization method to synchronize these streams. These methods can be used to compute a delay or time shift between signals and identify correspondence/correlation between frames in different input signals that are likely to represent the same content item or image.

Alternatively, if the input could include markers embedded in the media such as in the audio or video and these could be used directly for stream synchronization before applying the EpochSynch method for synchronizing the adaptive streaming transcoder or packager output. Such synchronization methods exist in the literature and may be implemented in various ways in practice. Several techniques exist to embed markers and timestamps in the streams known in the literature.

The system and method are implemented using the disclosed EpochSegmentSynch method follows in preferred embodiments. The distributed adaptive streaming transcoders are configured to produce constant duration segments with fixed duration D and timing relative to the time clock anchor using configured timescales. These parameters can be defined in a set of configuration-parameters. Said configuration-parameters can be given to the transcoders when these are started. The origin/packager combination (104, 106) then controls the distribution to one or more media clients (110) usually through a content delivery network 109. The constant segment duration D and a synchronization timestamp STS can be used to align the timing in the input time signal to the established time anchor.

STS is the time anchor of the input signal at input time 0 relative to the established time anchor. For example, if the input stream is relative to midnight 1-1-2020 (0) the STS is the number of seconds since the established anchor at midnight 1-1-2020. In the default case STS is 0 and the established anchor is used in the input as well. In this case the output timestamps are calculated as follows:

$$\text{frametime\_out}=\text{frame\_time\_in}+STS*\text{input\_timescale} \quad (1)$$

$$\text{Segmentboundary\_}K=K*D*\text{segmenttimescale} \quad (2)$$

$$\text{Next\_}K=\text{ceil}(\text{now}/D) \quad (3)$$

Equation (1) shows how the frame timestamp of the output frame is calculated based on the input. In case the input has another time stamping mechanism other conversion steps may be needed. In some cases, such as when converting MPEG-2 presentation timestamp and PCR to a continuous timeline some care may need to be taken as MPEG-2 TS presentation times may overflow leading to discontinuities, this could be corrected in the encoder as the overflow can be to detected and the encoder continues to output frame times. The 64 bit timing in MPEG-4 media segment, signalling in the BaseMediaDecodeTime field in the TrackFragmentTimeDecodeBox (tfdt) box, should not overflow or wrap around and be continuous in a live stream. However, it is known that for example MPEG-2 pts timestamps may overflow and wrap around, in the output media segments the output should be continuous and increasing.

In case the track timescale and the input timescale are not the same, the input time should also be adjusted for this by a timescale conversion. In this case the original input time is also multiplied by the track_timescale (segment_timescale) and later divided by the original (input) timescale. In this case it is important to avoid rounding errors, i.e. encoders should only choose integer multiples of the input timescale as the output track_timescale (segment_timescale).

To avoid rounding errors, the timescale of the input should either be the same as the output timescale or an integer fraction of the output timescale.

Care needs to be taken to choose timescales that still allow frame and sample accurate segment boundary alignment. In cases when audio samples for example use 1024 audio samples per ISOBMFF sample some careful selection of the segment duration is needed as well. To enable segment boundary alignment based on EpochSegmentSynch, common timescales and segment durations that work well are presented below.

TABLE 1

Some common aligned segment durations

| Media type | Framerate/ sample rate | time scale | Frames per segment | Segment duration D |
|---|---|---|---|---|
| Video | 25 fps | 25 | L*24 | L*0,96 |
| Audio | 48 Khz | 48000 | L*45 | L*0,96 |
| Timed text | — | 1000 | 1 or more | L*0,96 |
| metadata | — | 1000 | 1 or more | L*0,96 |
| Video | 30 fps | 25 | L*48 | L*1,6 |
| Audio | 48 Khz | 48000 | L*75 | L*1,6 |
| Timed text | — | 1000 | 1 or more | L*1,6 |
| metadata | — | 1000 | 1 or more | L*1,6 |

Note that in Table 1 timed metadata and timed text samples can be of arbitrary duration and can be updated to not affect the segment durations (i.e. keeping them constant). For example, a timed text sample of 4 seconds can be split into two samples when segment duration is 2 seconds, each sample containing the timed text cue or element, and similar for timed metadata samples if these are used.

Equation 2 shows how a segment boundary can be calculated, basically we use K multiplied by the segment duration D multiplied by the segment timescale to calculate the earliest presentation time of the K+1th segment since the established time anchor. Equation 3 then illustrates a way to calculate the next segment index K by using the current wall clock time now (assuming the system clock synchronization within 100 millisecond bounds), the input timescale and fixed segment duration D followed by rounding upward. This formula computes the next K for the next media segment based on a input time signaled now that an adaptive streaming encoder/packager may obtain from an operating system routine or from a time server. The segment boundary is the next segment boundary to use when an adaptive streaming transcoder or packager is joining a stream or session. The value of now should be the number of seconds since the established anchor such as Unix Epoch (1-1-1970 00:00:00) and can be computed based on commonly available routines on operating systems or time-services such as time.akamai.com url/uri that provide this number. It is assumed that the adaptive streaming transcoder can obtain such a timestamp from the information processing system and compute next K by dividing by D and taking the first positive integer greater than this fraction. This computes the next segment boundary from which the adaptive streaming transcoder can start transmitting frames to the streaming origin server. The next K is thus in fact the boundary of the $K+1^{st}$ segment since the anchor.

The earliest presentation time of the next media segment is then calculated according to equation (2). The integer K*D*segment_timescale is used for this. It is then expected that the media segment can be generated using a frame with frametime_out that is identical to this value. In case such a frame does not exist, interpolation of frames or other methods to resynchronize the frames may be required to be applied by the encoder to generate the frames as required in the output media segment. Some fixed instructions may be required to instruct the encoders to match the frames to segment boundaries, by using synchronization timestamp STS the input signal is shifted for frame outputs to align to segment boundaries.

In case additional IDR (Instantaneous Decoder Refresh coded picture typically made up of I- or SI-slices) frames need to be inserted by the adaptive streaming transcoder that is using EpochSegmentSynch, for example to signal a splice point indicated by a SCTE-35 marker, these can be inserted within a segment and a marker can be added to signal the splice point. In this case, a segment boundary is not created as the constant duration needs to be kept to align the segment boundaries and the output presentation timestamps.

The origin/packager can then split the segment into two segments or split it and merge the segments after the splice point boundary. In this case, either a new segment boundary may be introduced, or to keep the numbering of segments consistent the shortest segment resulting from the splice may be merged with the adjacent segment introducing a segment with a longer duration but keeping the number of segments the same as before the splice.

This helps to keep some of the requirements on DASH segment durations such as when using @duration and number based addressing schemes when using SegmentTemplate element in a DASH manifest. In case non-integer frames are used, audio segment durations may vary to align to video segment durations.

Adaptive Streaming Transcoders or packager can be optimized to produce aligned media segments based on the method disclosed in this invention. A way to transmit these downstream after their generation, in preferred embodiments of the disclosed invention is by using DASH-IF live media ingest protocol. In this protocol each segment is transmitted using an individual HTTP POST or PUT method to a URL that identifies the channel/publishing point extended by a relative URL to identify the track and/or segment. The segment can be transmitted as soon as it is available reducing transmission and request latency. Also, the adaptive streaming transcoders do not need to handle incoming requests relieving the encoders from a task that may introduce significant overhead. The protocol defines procedures for retransmission in case failures happen in a robust manner and features for secure transmission. Other protocols for sending a media segment can be used such as based on HTTP POST and HTTP PUT or other push-based methods for sending media segments such as MPEG Media Transport protocol. In case a transmission returns an error code, an encoder/packager may retransmit the media segment and the initialization segment preceding the media segment.

A common way to define the URL to post the segment to is by deriving the SegmentTemplate element and its @media and @initialization attributes from the MPEG-DASH manifest, or based on a similar logic from the Media Playlist. The derivation of the segment URL is then done as defined in the MPEG-DASH specification, ISO/IEC 23009-1 combining the replacing the template fields $RepresentationID$ strings and the $Time$ or $Number$ strings with the actual values derived for the template fields.

The protocol sequence starts by the encoder transmitting an optional Manifest presentation description MPD to signal the grouping of tracks and available representations and the naming structure in the SegmentTemplate DASH element. In this case @media and @initialization the $RepresentationID$ and $Time$ or $Number$ substrings. The @media and @initialization attributes should be equal for different Representations (when present) and AdaptationSets (when present) and can be used to generate the POST URL of the segment by substituting the $Time$ string with the earliest presentation time of the segment and substituting the $RepresentationID$ string with the Representation@id.

This way, segments, tracks and groupings are easily identified by the receiver based on the naming scheme imposed by the SegmentTemplate. The next step is to issue a HTTP request with a POST command with the initialization segment, followed by POST commands with a media segment in the body. In case a failure happens, segments can be re-transmitted and a receiver could use a redundant version of the segment. The naming scheme introduced by the manifest is expected to stay the same during the presentation.

In case of EpochSegmentSynch the @availabilityStartTime in the MPD element would be 1970-01-01T00:00:00Z or semantically equivalent and period@start of PTOS. In case Period@start is not PTOS or a semantically equivalent a corresponding SegmentTemplate@presentationTimeOffset may be used to enable media presentation timing to still be relative to the anchor. The preferred approach to send the segments from the adaptive streaming transcoder to the receiving streaming origin or packager is by using the DASH-IF live media ingest protocol. FIG. 10. Shows an example of a MPEG-DASH MPD (I-MPD) for a synchronized transcoder ingest mode. The MPEG-DASH manifest used to describe the track and presentation before sending the one ore more media segments is referred as the ingest-mpd (or I-MPD herein). The I-MPD is a media presentation description as described in ISO/IEC 23009-1 that follows the additional constraints from prior clauses.

The method and system can be implemented in hardware or software, for example the FFMpeg library can be used to implement the method, by adding an offsets and timescale configuration to the dash muxer or mp4 muxer and options to add a timescale for audio/or video. The MPEG-DASH or CMAF/MP4 muxers are then used to create the segments with aligned segment boundaries and timestamps. However, in many cases a conversion at the input is needed to map the input timestamps to timing based on the well-known anchor of using UTC relative to Epoch (1-1-1970) or another established anchor.

There are some more complex cases, such as the case when splice points are inserted for targeted ad breaks. In this case, to keep constant segment duration, additional IDR or key frames need to be inserted in segments while not creating a new segment boundary). In this case the receiver/origin is responsible for splitting the segments in to two in case this is needed for the splice point signaling. This way the redundant architecture is kept and in case the ad slot/splice point signaling is redundant and accurate the right segment boundaries are produced. By inserting IDR frames without inserting a segment boundary the splice points can be generated but the constant duration segments are kept allowing alignment of the output of different adaptive streaming transcoders or packager. The packager or streaming server may then introduce a new segment boundary. Alternatively, it could merge the smallest segment resulting from the splice with the adjacent segment in the media presentation.

Another case is the case for non-integer frame-rates that are commonly used in some North American deployments. These often lead to variable durations of segments, however, by using an integer multiple M, research has shown that the pattern of variable segment durations is repetitive. By choosing a super segment with duration E ×D a constant super segment that combines multiple segments with duration S can be used instead to find the frame accurate segment boundaries. This is also something that is part of DASH-IF IOP pattern-based segments, where segments are grouped in patterns to capture this repetition. This would require keeping track of both K, the index of the segment since epoch and N the number of super segments since the established time anchor. Alternatively, segments with slightly deviating duration may be signaled using $Number$ based signalling in the manifest and the URL structure, in this case the sequence number is used as a key instead of the earliest presentation time. In case the average segment duration is still constant over time, this may result in consistent calculation by using K or K+1 as the sequence number of the segment.

The media segments generated by the one or more adaptive streaming transcoders or packagers, may be based on the common media application format defined in ISO/IEC 23000-19 or MPEG-DASH defined in ISO/IEC 23009-1. In some cases, the input signal to a transcoder may be absent due to a transmission error, or due to the signal temporarily being unavailable. The media segments in this case, when one or more frames in time have not been received by the transcoder may be filled by filler content, to keep a continuous timeline of the media presentation. The adaptive streaming transcoder will perform the step of identifying frames in the overlapping period from earliest presentation time to earliest presentation time plus D (times segment timescale) are missing, and will insert filler content. This filler content could be black or white frames, a SMPTE color bar scheme indicating the outage, copies of earlier frames or pre-recorded slate content. Slate content can be media frames specifically recorded and inserted to fill absence of the main media or advertisement content. Such sequences may include promotional material from the broadcasters, or a message to the viewer that the content is currently absent. In most cases it can be a content that is easily generated by the encoder to timely fill the gap, such as samples of audio and video that can be easily generated and encoded. In case the one or more transcoders generate the media segment, as based on the MPEG-DASH specification and the CMAF specification a segmentType Box (styp) may be added to signal the brand of the segments. In the case the media segments includes one or more. This is done by including the 4 character code ‘slat’ as an unsigned int(32) major_brand or as a an entry in the list compatible_brands [ ] in the SegmentType box. Commonly the slat brand would be included in the list of compatible_brands of unsigned 32 bit integers used to represent four character (4cc) codes of 1 bytes (8 bits) each. A receiver, such a streaming origin, or packager can, when receiving media segments from one or more transcoders/packagers overwrite a segment that includes the ‘slat’ brand with a media segment that does not include the ‘slat’ brand to select a media segment without missing samples for the same media and a media segment having the same earliest presentation time.

Last, another complex case is when input timing is not consistent and input signals are different. In this case pre-processing and algorithmic approaches are needed to align the signals and insert timing information per frame based on this. This would require both an alignment step for synchronization and then a step to communicate the alignment to encoders. There exist different algorithms in the compressed and or image domain to compute correspondence and correlation between frames. Alternatively, it is also possible that timing markers are inserted in the media itself. In this case the media markers can be used to recover the synchronized timelines of the media content. Thus, preferred embodiments may include combinations of the techniques disclosed in with techniques to compute correlation and alignment between frames based on image or compressed domain features of the tracks or when using marker based approaches.

The EpochSegmentSynch approach teaches how segments should be generated with segment boundaries and time-scales to achieve frame alignment. The EpochSegmentSynch fits well with the Internet delivery model as it uses a redundant multi-path approach that also is stateless. Experiments using this approach in large deployments showed that it is suitable for the same reasons the internet was suitable for robustness.

A receiver of one or more output tracks or one or more input signals as output by one or more adaptive streaming transcoders or packagers, may want to target storing one or more output tracks synchronized with the EpochSegmentSynch method disclosed herein. In this case a receiver, that may also be an adaptative streaming transcoder/packager, an origin server a packager or any other entity targets efficient storage such as in a cloud-based storage. The follow text discloses how EpochSegmentSynch can be used to enable effective storage in cloud-based storage, such as object storage. An important task for a receiver is to receive the one ore more output tracks, one segment at a time, where in preferred embodiments these are generated be one or more adaptive streaming transcoders/packagers as described using the EpochSegment Synch approach.

The receiver, may read a constrained manifest (I-MPD) to detect the grouping and target naming structure of media segments to be received. It then receives the initialization segments or CMAF Headers followed by one ore more media segments. The receiver would append these CMAF media segments as to keep the output track in memory and continuously receive more media segments and update the output tracks. In the case the receiver is an archiver, it needs to store the received media segments or output tracks from the one or more encoders in a cloud-based storage or in another optional storage.

To do this efficiently, this document describes the storage MPD, the S-MPD, the S-MPD is constrained by several attributes and elements in the manifest when used for archiving, i.e. as an archiving MPD for 24×7 live content. The main difficulty with 24×7 live content is that the archive is continuously growing and getting bigger. The option to store a single media segment per file is unattractive as it blows up the storage requirements very much in terms of read write and particularly for indexing.

Naive storage of the segments using the iso live profile (implying storing a single file per segment directly) is thus undesirable as it may blow up the cloud storage indexing and read-write requirements. Long and personalised archives using a single file per segment will result in huge overhead in TOP operations both when reading or writing a subset of the archived presentation. For example, the operation to defragment the archive in a progressive mp4 file requires downloading each segment in the archive.

The problem of the on-demand profile for MPEG-DASH for archiving live 24×7 content is that only a single file per track is stored and that most storage solutions do not support append or update operations on objects in the cloud storage, but only rewrite. This makes such a solution costly in terms of read-write operations and upload bandwidth. Every-time the track file needs to be updated, it needs to be downloaded, appended with the new segment and uploaded again. This results in huge overheads Another challenge for archiving 24×7 live content using an S-MPD is the fact the S-MPD may need to be updated to account the current situation/state and this may cause race conditions. Ideally the S-MPD is updated after each new segment is written, but in the case of multi-track and multi-threaded receivers threads/processes may try to update/append the S-MPD at the same time. This is undesirable as it wastes valuable time and IO resources and may even lead to instability to writers waiting to access the S-MPD resource from the cloud storage.

An intermediate and specific solution is proposed for archiving 24×7 live contents that addresses these issues. It works well with synchronised encoder content as generated based on the proposal in output of one or more synchronized transcoders/packagers.

The method and system for archiving 24×7 live content, introduces fixed duration arhi(with small deviations allowed) archive track files. These archive track files are stored as long duration media segments in the S-MPD. These media segments contain all data from the archive track file except the initialization segment or CMAF Header and may also include the SegmentIndexBox (sidx). The SegmentIndexBox may be used to index parts of the archive track files.

The first long duration archive track segment may also be of a shorter duration as compared to the target fixed duration. In case the initialization segment changes a new Period would need to be introduced to describe it, this is not described in this contribution but may be discussed more when the proposal is accepted.

When using EpochSegmentSynch to write segment or track file archives, the archiver is configured to generate and store archive track files using a fixed duration M. The S-MPD uses the iso live profile, and SegmentTemplate elements with @duration set to the fixed duration M accounted for the timescale of the tracks. This avoids the need for MPD updates that may lead to race conditions and issues accessing the MPD from different processes and/or threads.

Table 2 describes the constraints on the manifest when used as S-MPD for archiving content (sometimes referred to as A-MPD, archiving MPD). The @availabilityStartTime is set to the time of the earliest presentation time of the first archive track file (if this S-MPD is written after that has been received) or the time the MPD was written given that this is before the earliest presentation time of the first archive track segment. The MPD@minimumUpdatePeriod attribute is absent as the intent is that the MPD does not change and is not updated. The @timeShiftBufferDepth should be absent unless the solution also handles removing archive track segments. AdaptationSet elements are created corresponding to the I-MPD using similar configuration of the adaptation sets, but as SegmentTemplate@duration and number-based indexing using $Number$ is used instead of $Time$.

In preferred embodiments the S-MPD or A-MPD is written before actual archive track files are written to the storage. The steps of writing and initializing an S-MPD or A-MPD based on an I-MPD and one or more output tracks from one ore more different sources such as adaptive streaming transcoders and packagers are described in Table3. The target archive track duration M is read from a memory and so is the output track timescale and they used to populate SegmentTemplate@timescale and SegmentTemplate@duration attributes. In preferred embodiment the @duration being set to M accounted for the SegmentTemplate@timescale.

The receiver appends media segments read into archive tracks of duration M=L×D, i.e. an integer multiple of the fixed segment duration. Table 4 illustrates the steps of the method of archiving by reading in the archive track files at fixed boundaries. The formulas are similar as in (1), (2) and (3), with (1) corresponding to formula (4), (2) to (5) and (3) to (6). In formula (1) instead the frame_time_in may be the earliest presentation time of the segment received and segmentboundary_L B is the earliest presentation time or boundary of the archive track file. The next L may be computed in the same way with L being the first integer larger than now divided by M. similar as in (3). In this case instead of media segment, archive track files are generated, that may combine multiple media segment and also include a CMAF Header, a SegmentIndexBox. By computing the segmentboundary_L of each archive track file each archive track file can be generated by the steps shown in Tabl3 4 and the SegmentTemplate @media and @initialization are used to derive the naming of the output archive track file to be written in the storage. Similar as when using the method for output track synchronization the preferred method for transmitting or storing archive track segments is by using an HTTP POST or PUT Method.

$$\text{frametime\_out}=\text{frame\_time\_in}+STS*\text{input\_timescale} \quad (4)$$

$$\text{Segmentboundary\_}L=L*D*\text{segmenttimescale} \quad (5)$$

$$\text{Next\_}L=\text{ceil}(\text{now}/M) \quad (6)$$

When the live stream stops, and no more segments are expected, the MPD@type attribute may be changed from 'dynamic' to 'static' and the SegmentTemplate@endNumber, Period@duration attributes may be set in the manifest.

A similar storage playlist can be created using HTTP Live Streaming, a master playlist referencing a media playlist for each track. In this case however, the media playlists need to be updated each time a new archive track file is written. The naming of the media playlists and segment naming/uri should follow the same structure as follows from the MPEG-DASH mpd. Therefore, preferred embodiments use the S-MPD or A-MPD as contrained in Table 2 for live synced content storage in the archive.

S-MPD for other types of content that is not dynamically updated or coming from synchronized encoders, may relax constraints on the profile and attribute usage and such 5-MPD can still be used to describe the stored media asset presentation in the storage. Table 5 shows alternative profiles such as defined in ISO/IEC 23009-1 that may be used for an S-MPD of stored content that may not be updated, in this case iso on demand profile may be used for @profiles and for other simple cases the live profile may be used in case the stored asset is limited in size and duration.

The advantage of using the S-MPD as constrained in Table 2 by a receiver or archiver following the steps outlined in table 3 and table 4 poses many advantages. The MPD or manifest description need not to be updated and no inter-process communication is required except the configuration of duration M and possible the Synchronization time stamp S and the targeted remote storage location. An archiver receiving one or more output tracks can archive these in any remote storage with a simple storage API that enable storing reading and deleting objects from it. The S-MPD can be used to reference the archive track segment by any application that targets to re-purpose the stored content or play it out again in a different format.

TABLE 2

| Constraints on the S-MPD for 24x7 live content or encoder synced content |
|---|
| 1. The MPD follows the the iso live profile (urn:mpeg:dash:profile:isoff-live:2011)<br>2. MPD@type shall be ‘dynamic’<br>3. @availabilityStartTime is set to the earliest presentation time of the first archive track segment (or if it is not known to the time the MPD was written)<br>4. Period@start is set to “PT0S” or a semantically equivalent value<br>5. MPD@minimumUpdatePeriod shall not be present<br>6. MPD@timeShiftBufferDepth and Period@timeShiftBufferDepth shall not be present<br>7. Each AdaptationSet shall contain a SegmentTemplate element, the SegmentTemplate element constrained as follows:<br>Each SegmentTemplate@presentationTimeOffset is present to make the media presentation timing relative to the epoch anchor, i.e. 1970-01-01T00:00:00Z, the time is MPD@availabilityStartTime - 1970-01-01T00:00:00Z (the STS from proposal Mxxxx) adjusted for the SegmentTemplate@timescale<br>The SegmentTemplate@duration is set to the fixed duration M adjusted for SegmentTemplate@timescale<br>a. SegmentTemplate@media is the same for each SegmentTemplate and contains the substring “$RepresentationID$” and “$Number$”<br>b. SegmentTemplate@initialization is the same for each SegmentTemplate and contains the substring “$RepresentationID$” |

TABLE 3

| Steps for writing the S-MPD for 24x7 live content or encoder synced content |
|---|
| 1. Initialise the S-MPD based on constraints from Table 2, read the configuration values for duration M from a memory<br>2. Set the MPD@availabilityStartTime and SegmentTemplate@presentationTimeOffset fields to the earliest presentation time of a received archive track file (or if this is not known to the time the MPD was written)<br>3. Read the I-MPD and create the corresponding AdaptationSets in the S-MPD,<br>The SegmentTimeline is not used but instead SegmentTemplate with @duration is used, @duration being set to M accounted for the SegmentTemplate@timescale<br>a. Representation@id matches between the I-MPD and S-MPD<br>b. The @@startNumber is set to floor(MPD@availabilityStartTime (in seconds relative to 1970-01-01T00:00:00Z)/M)<br>c. SegmentTemplate@media from I-MPD but replacing $Number$ instead of $Time$<br>4. Only write the S-MPD to storage if it was not already present in the storage |

TABLE 4

| Steps for writing the archive track files for 24x7 live content or encoder synced content (assuming the S-MPD is already written) |
|---|
| 1. Compute the next archive track boundary next_L, the L + 1th archive track file since the established anchor 1970-01-01T00:00:00Z by next_L = ceil(now/M), where now is the seconds based timestamp relative to Epoch or the established anchor.<br>2. Compute the next archive track file boundary B as next_L * D * output track timescale<br>3. Identify from the input signal the frame time information, in this case the input is a CMAF media segment, it is the CMAF media segments earliest presentation time, potentially adjust it with a synchronisation timestamp<br>4. Append the incoming media segment in memory to the continue creating the archive track file<br>5. In case the media segment earliest presentation time plus the media segment duration equals or is greater than B goto 6 otherwise to 3<br>6. Upload the in-memory archive track file using the SegmentTemplate URL generation substituting $RepresentationID$ for the Representation@id derived from the input track and replacing $Number$ by next_L − 1. The upload may be through an HTTP PUT or |

TABLE 4-continued

| Steps for writing the archive track files for 24x7 live content or encoder synced content (assuming the S-MPD is already written) | |
|---|---|
| | POST request. |
| | If successful: |
| a. | remove the in memory CMAF media segments but keep the CMAF Header, increment next L and continue to 2 |
| | Otherwise: |
| a. | try again once more, if it fails again continue to 5.a |

TABLE 5

| Summary of the different S-MPD's that can be used | | |
|---|---|---|
| | @profiles | how |
| 24x7 live | urn:mpeg:dash:profile: isoff-live:2011 | As in clause 6.2, no SegmentTimeline, may use CMAF profile for DASH |
| simple live | urn:mpeg:dash:profile: isoff-live:2011 | may include SegmentTimeline, may use CMAF profde for DASH |
| VoD | urn: mpeg: dash: profile: isoff-on-demand:2011 | may use CMAF profde for DASH |

TABLE 6

| MPD types introduced and their usage. | |
|---|---|
| I-MPD | Used to announce tracks and groupings and expected segment naming structure. |
| S-MPD | Manifest that describes a stored content asset intended for re-purposing |
| D-MPD | Delivery manifest, referencing segments and tracks, targeting a client device as in the original scope of ISO/IEC 23009-1 |

FIG. 1 illustrates a common reference setup or architecture used in over-the-top streaming head ends used by a broadcaster or operator, and within this setup several of the techniques disclosed in the embodiments may apply, in different forms not necessarily fixed to the preferred embodiments. In many setups the entry point to the over-the-top streaming workflow is the Adaptive Streaming transcoder 102 that can be an adaptive bit-rate transcoder such as for example developed by different companies in hardware or software. Adaptive streaming transcoders 102 take input content 101 and transcode it to different visual qualities and bit-rate renditions. The results are output tracks that are then transmitted to the streaming server 104, that may be composed of a packager 106 to package content in the right format for content distribution and serve the content to clients 110 via content delivery networks 109 or other entities. The input content 101 can be in any of the common contribution formats or legacy broadcast formats. Examples include RTP/SDP based ingest suing SMPTE 2110 over internet protocol, or using MPEG-2 Transport stream formats based on commonly used ATSC, DVB or ISDB television standards or other standards that adopted MPEG-2 Transport streams for broadcast. Other common formats for distribution include Zixi and Secure real-time transport SRT based protocols for ingesting the input content to the adaptive streaming transcoder. The adaptive streaming transcoder 102 prepares the content in different qualities and different bit-rates and in preferred embodiments encodes the content to Common Media Application Format or ISO Base Media File format tracks using MovieFragments. In an output based on Common Media Application format or ISO Base Media File format using movie fragments, content is segmented in smaller individually addressable and playable pieces. In preferred embodiments, each of these pieces, referred to as media segments use the same constant duration D. The adaptive streaming transcoder 102 transmits the segments and/or tracks to the streaming origin server 104, typically using HTTP POST or other push-based method, in preferred methods the transmission is based on the DASH-IF live media ingest protocol format that allows the transmission of common media application format segments of HTTP using POST or PUT Method, and an optional manifest to indicate the grouping of tracks for the receiver. The streaming server 104 has a packager component (106) to re-package and encrypt streams for consistent delivery to clients (110), examples of encryption modes and DRM's include common encryption based on MPEG-B as defined in ISO/IEC23001-7 or AES encryption of segments. In many cases a commercial DRM is used that enable associated license acquisition such as Apple Fairplay, Google Widevine or Microsoft Playready DRM's. Preferred embodiments of the streaming server are based on Unified Origin as developed by CodeShop and Unified Streaming, but other similar implementations by other vendors such as Wowza systems, Ateme, Broadpeak bks, Harmonic, MediaMind, aws MediaPackage or other origin servers with packaging capabilities may be used. The Content delivery network (109) is responsible for distribution and intermediate caching of encoded and packaged media segments. This includes storing segments at edge servers and forwarding them to clients. A content delivery network 109 may use servers for caching such as based on Nginx, Varnish, Apache webserver or other webservers and can also be based on commercially available full implementations such as using AWS CloudFront, Akamai, limelight, CDN Networks or other commercial offerings of CDN 109. The segments are forwarded and transmitted to streaming clients 110 which may use a playback platform 111 that usually includes a content decryption module for decrypting and playing back the content. The clients and servers may use application server/client (112 and 107) to add application logic to enable customized features such as session-based streaming or personalization. The MPD manipulator 108 is an edge-based component that may change segment references or update manifest/playlist in order to customized content that users receive. The goal of the MPD manipulator 108 is to prepare the content for ad insertion and other use cases such as customized playlists etc without changing underlying segments. Common implementations that do dynamic ad insertion based on an MPD manipulator include google dynamic ad services and Yospace dynamic ad services, google DAI or doubleblick, but any service or implementation could be used to achieve server-side ad insertion as also documented by the DASH-Industry forum version 5. In some cases, instead of the output of an adaptive streaming transcoder, a stored content is used as input to a workflow, or streaming setup from a cloud storage 103. Typical examples of cloud storage include AWS s3 cloud, Google storage cloud and Azure storage cloud and OpenStack swift. By using stored input to the streaming head-end use cases related to VoD-to-Live, catchup TV and other more tailored services can be developed. In this case the streaming origin server is responsible for converting the input content to the right format to be played out in an altered form.

FIG. 2 illustrates the configuration of a setup to realize preferred embodiments of the disclosed embodiments following the reference architecture from FIG. 1. To realize a redundant infrastructure with more than one adaptive streaming transcoders 102 and multiple streaming server origins/packagers (104 and 106 respectively) and one or more content delivery networks (109) are coupled communicatively. The coupling is done through a network 302 (shown in FIG. 3) having connections using a protocol for exchanging segment media data. In preferred embodiments the communication between the adaptive streaming transcoder 102 and the streaming server 104 is based on segments in the ISO base media file format or MPEG-2 transport stream format. In preferred embodiments the communication is implemented using the live Media ingest protocol developed by the DASH industry forum and published as a technical specification. Alternative embodiments use HTTP POST or PUT method combined with ISO BMFF or Common Media application format segments or other protocols for transmitting the media segment data. The configuration data is accessible to each distributed transcoder, it can potentially be passed as one or more configuration parameters 202. The one or more configuration parameters 202 can include the fixed segment duration D, the timescale for audio tracks and the timescale for video tracks, and the STS (synchronization timestamp) if needed to map the input timing information from inputs back to a timeline relative to the fixed anchor, the fixed anchor being the Unix epoch 1-1-1970 midnight or another well-known reference anchor, in iso date time it may be described as "1970-01-01T00:00:00Z". The one or more configurations can be passed to the one or more distributed adaptive streaming transcoders 102. The one or more distributed transcoders 102 may do different calculations to find the start of the segment (the earliest presentation time) and the duration based on the one or more configuration parameters 202 and the input content with internal timing information. The equations to compute the segment boundaries and per frame sample timing are given as follows. Frametime_out=(frame_time_in*segmenttimescale/input timescale+STS*(segmenttimescale)) Thus, the output time is in time sts compensated for segment timescale (segment timescale is the timescale of the track signalled in the mediaHeaderBox 'mdhd' in the initialization segment of the track) (output timescale) and the input_timescale is the timescale of the original input.

In many embodiments that avoid rounding errors the output timescale (segmenttimescale) is an integer multiple of the input timescale. Note that segmenttimescale and output track_timescale or output timescale are used to refer to the same construct herein, and these terms may be used interchangeably.

The next segment boundary or earliest presentation time is computed by K*D*segmenttimescale. To Compute the next segment (K+1) th since epoch or the time anchor, the current time relative to epoch referred to as now divided by D and find the nearest integer larger than this number would yield the next value of K.

Figure 3:
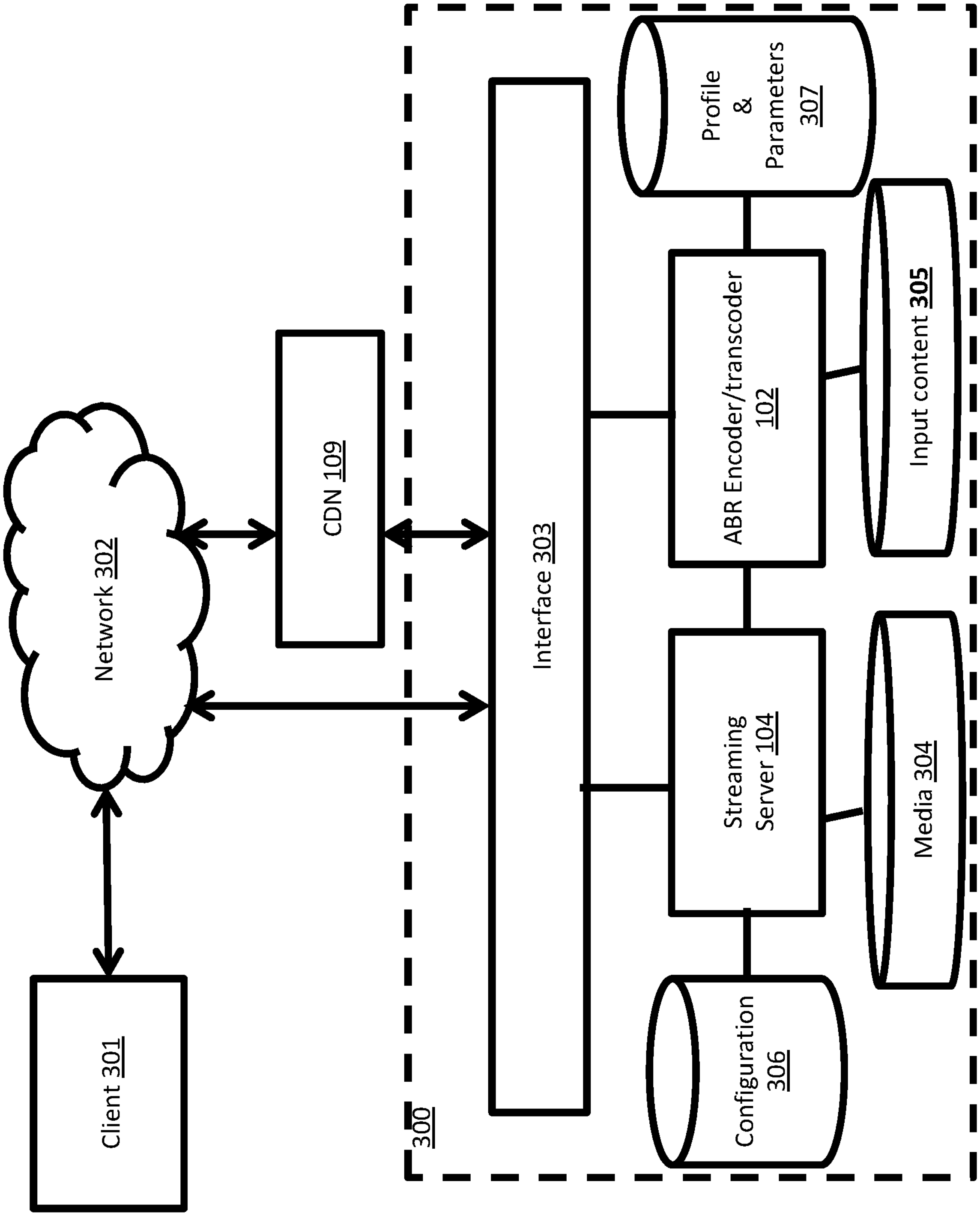
FIG. 3 illustrates an example subsystem for adaptive streaming packaging transcoding and adaptive streaming that can be utilized in accordance with various embodiments.
Figure 6:
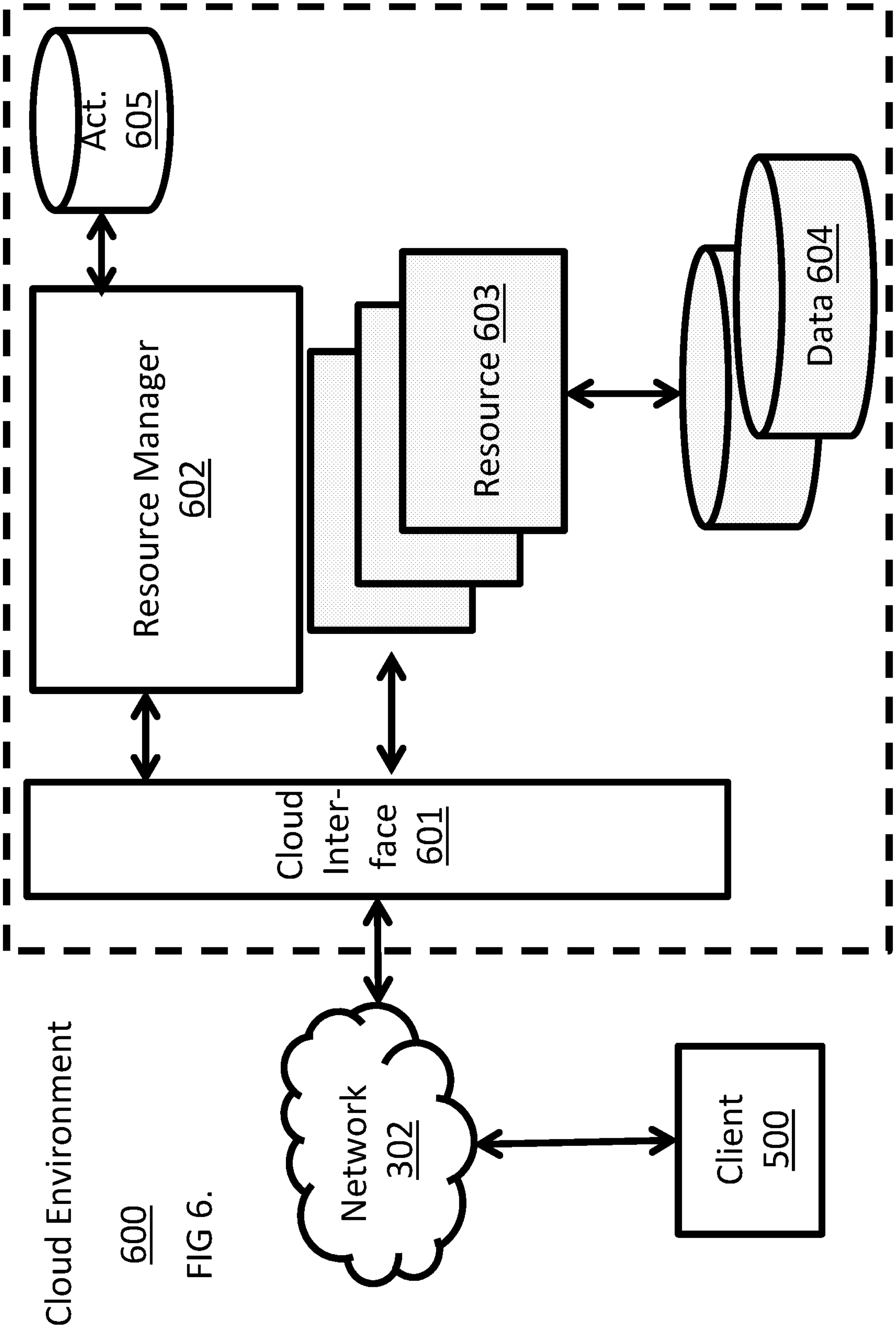
FIG. 6 illustrates an example computational environment for deploying a distributed packaging and trans-coding system, using shared computational resources, such as cloud computing in accordance with the embodiments.

FIG. 3 illustrates an example system 300 that can be used to implement aspects of the various embodiments, in an electronic environment such as that discussed with respect to FIG. 6. In the system 300 of FIG. 3, a client computing device 301 can submit a request for content across at least one network 302 to be received by a content provider environment or system 300. As mentioned, in at least some embodiments the request can include a request for content to be displayed on the computing device 500 of FIG. 5 or other client devices, and in many cases will include video or other media content that is encoded for presentation on the client device 301. The network(s) 302 can include any appropriate network, such as the Internet, a local area network (LAN), a cellular network, an Ethernet, or other such wired and/or wireless network. A content provider environment 300 can include any appropriate resources for providing content from a resource provider, as may include various servers, data stores, and other such components known or used for providing content from across a network (or from the "cloud"). As mentioned elsewhere herein, the client computing device 301 can be any appropriate computing or processing device, as may include a desktop or notebook computer, smartphone, tablet, wearable computer (i.e., smart watch, glasses, or contacts), set top box, or other such system or device. An interface layer 303, when receiving a request or call, can determine the type of call or request and cause information to be forwarded to the appropriate component or sub-system. For example, a request for content might be forwarded to a streaming server 104 while a request to specify encoding parameters might be forwarded to an Adaptive Bitrate Streaming (ABR) Encoder 102, among other such options. These calls or requests can also come from third parties, although third party providers can also provide at least some of the media content to be stored to a media repository 304 and encoded for display on the client device 301 as discussed herein. Input content 305 can also provide the source of data content via the ABR Encoder 102 and interface 103 and to the client device 301 via network 302 or via CDN 109 and network 302.

In one example, an interface layer 601 of the environment 300 in FIG. 3 or 600 in FIG. 6 receives a call. As known for network environments, the interface layer 601 can include components such as interfaces (e.g., APIs), load balancers, request and/or data routers. If the request is a request for content, such as for a video data stream to be provided to the client device 301 or 500, information for the request can be directed to one or more streaming servers 104, which can obtain the content from a media data store 604 or other such repository to be sent back across the network(s) to the computing device.

In at least some embodiments a request from an operator, an administrator, a client device 301, a third-party provider, or another such source might include a request to specify one or more sets of encoding parameters to be used with a media file. Accordingly, information regarding the encoding parameters can be provided to a ABR Encoder 102, or other such component or service, that is able to receive the information through an appropriate interface (i.e., an API or console) and cause the profile and parameter data to be stored to appropriate repositories 307 as discussed elsewhere herein. In some embodiments of the disclosed embodiments EpochSegmentSynch, a constant duration and fixed timescales for audio video and a synchronization timestamp are made available to the distributed adaptive streaming transcoders through the configuration parameters (306 or 307).

When a request for a video file is received, the streaming server 104 can use the profile and parameter data 307 to determine the appropriate encoding information, and can pass that to one or more ABR encoders 102, which can obtain the media file from media data store 304 (or from input content 305) and encode the media file per the encoding information, which can then be provided to the client device 301 by the streaming server 104 or other such component.

A streaming server 104 can be an origin active bitrate video HTTP server. The encoder/packager can receive a signal (e.g., request) and send a signal (e.g., response). The signal request can represent a data request (e.g., an HTTP request) from one of the client devices 110 forwarded to the origin server by the CDN 109. For example, the signal request may be an HTTP request for the origin server to send digital data to one of the client devices. The signal response may represent a data response from the origin server to be forwarded by the CDN 109 to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The streaming server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN 109). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN 109 until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The streaming server may be configured to perform a content invalidation. For example, one or more of the content segments may be invalidated. Content invalidation may prevent and/or stop content from being delivered to the client devices. Invalidation may be configured by the operator using expiry modes and time shift buffer depth configuration. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN 109. For example, the client device may request the manifest file and when the TTL value expires for the cached manifest in the various nodes of the CDN 109, the updated manifest file (e.g., the invalidated manifest) may be distributed throughout the CDN 109 to the client device.

Figure 4:
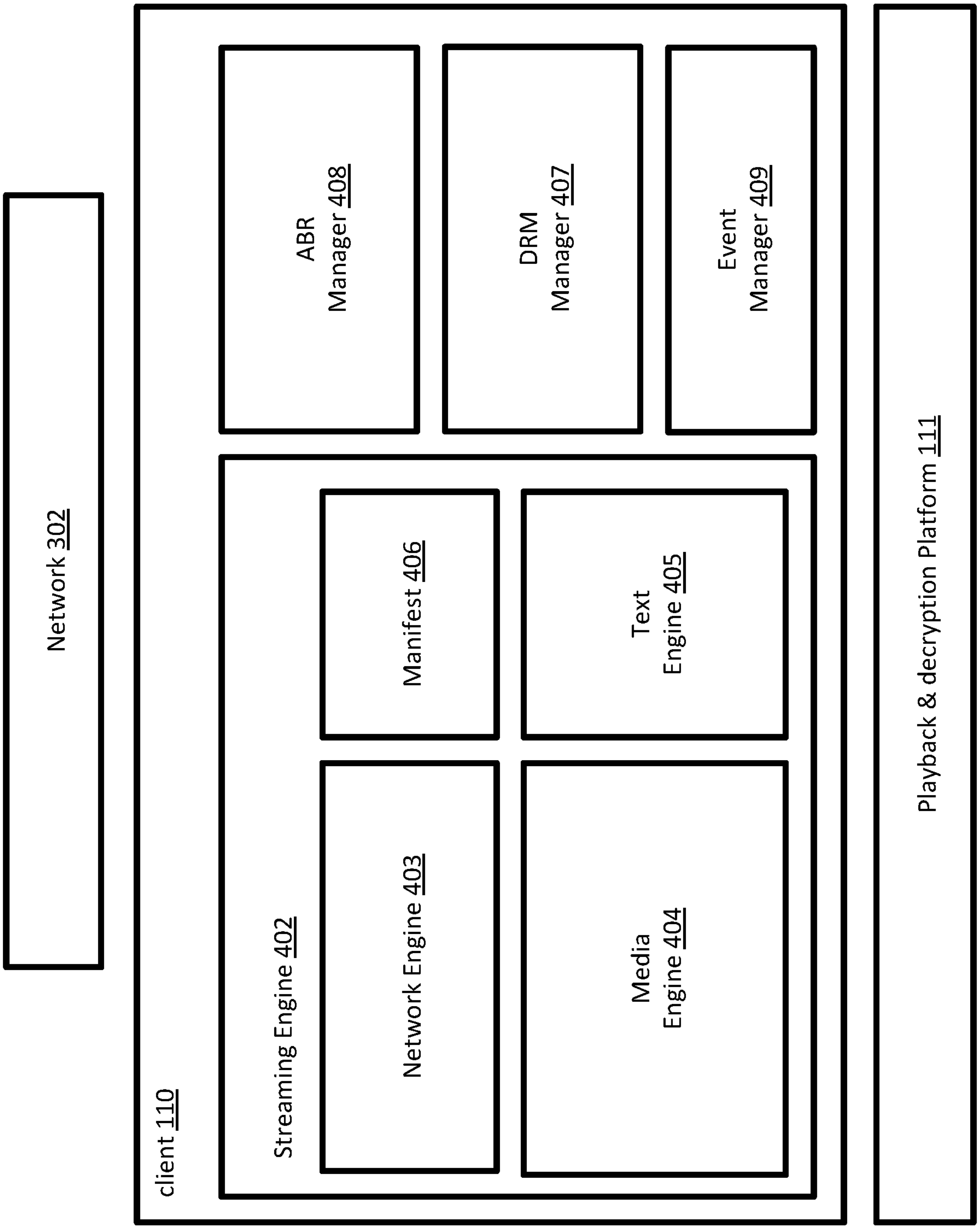
FIG. 4 illustrates the architectural components of a client receiving and requesting an adaptive streaming content in accordance with the embodiments.

FIG. 4 illustrates an example streaming client implementation in an environment or system 400 as used in several embodiments. A network 302 can be used by the DASH client 110 to receive data such as following HTTP requests. Most notably the DASH client 110 keeps track of a streaming manifest 406, and a streaming engine 402 can possess a network engine 403 for making requests for segments and other HTTP(S) requests and a media engine 404 for managing media segments and pushing them to playback at playback and decryption platform 111. The streaming engine 402 can further include a text engine 405 responsible for fetching and rendering text tracks such as tracks based on WebVTT or TTML or other popular subtitle formats such as CEA 608/708. An ABR Manager 408 is responsible for ABR logic such as choosing and selecting bit-rates from adaptation sets in order to achieve high quality playback without stalling for example. A DRM Manager 407 is responsible for fetching license keys and potentially decryption keys for playback of content on the playback and decryption platform 111. Common implementations include Shaka player as developed by Google or dash.js as developed by the DASH industry forum, where many other similar implementation and commercial implementations exists possessing similar functionality. An Event Manager 409 is responsible for handling stream events, in HLS or HTTP Live Streaming, these could be #EXT-X-DATERANGE tags, or in MPEG-DASH these could be inband events as defined by the DASHEventMessageBox, or MPD Events signaled by an EventStream Element and Event Element in the MPEG-DASH media presentation description. The Event manager 409 is responsible for dispatching events either to applications or to other entity.

FIG. 6 illustrates an example cloud environment 600 in which aspects of the various embodiments can be implemented. In this example a user is able to utilize a client device 110 or 500 to submit requests across at least one network 302 to a resource provider environment 600. The client device can include any appropriate electronic device operable to send and receive requests, messages, or other such information over an appropriate network and convey information back to a user of the device. Examples of such client devices include personal computers, tablet computers, smart phones, notebook computers, and the like. The network 302 can include any appropriate network, including an intranet, the Internet, a cellular network, a local area network (LAN), or any other such network or combination, and communication over the network can be enabled via wired and/or wireless connections. The resource provider environment 300 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing,"

among other such terms and depending upon the specific environment and/or implementation. In this example the provider environment includes a plurality of electronic resources of one or more types. These types can include, for example, application servers operable to process instructions provided by a user or database servers operable to process data stored in one or more data stores or resources 603 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 603 can submit a request that is received to an interface layer 601 of the provider environment 600. The interface layer can include application programming interfaces (APIs) or other exposed interfaces enabling a user to submit requests to the provider environment. The interface layer 601 in this example can also include other components as well, such as at least one Web server, routing components, load balancers, and the like. When a request to provision a resource is received to the interface layer 601, information for the request can be directed to a resource manager 602 or other such system, service, or component configured to manage user accounts and information, resource provisioning and usage, and other such aspects using an account database 605 for example. A resource manager 602 receiving the request can perform tasks such as to authenticate an identity of the user submitting the request, as well as to determine whether that user has an existing account with the resource provider, where the account data may be stored in at least one data store 604 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so, it can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 500 to communicate with an allocated resource without having to communicate with the resource manager 602, at least until such time as a relevant aspect of the user account changes, the user is no longer granted access to the resource, or another such aspect changes.

The resource manager 602 (or another such system or service) in this example can also function as a virtual layer of hardware and software components that handles control functions in addition to management actions, as may include provisioning, scaling, replication, etc. The resource manager 602 can utilize dedicated APIs in the interface layer 601, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 601 in at least one embodiment includes a scalable set of customer-facing servers that can provide the various APIs and return the appropriate responses based on the API specifications. The interface layer 301 (see FIG. 3) also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
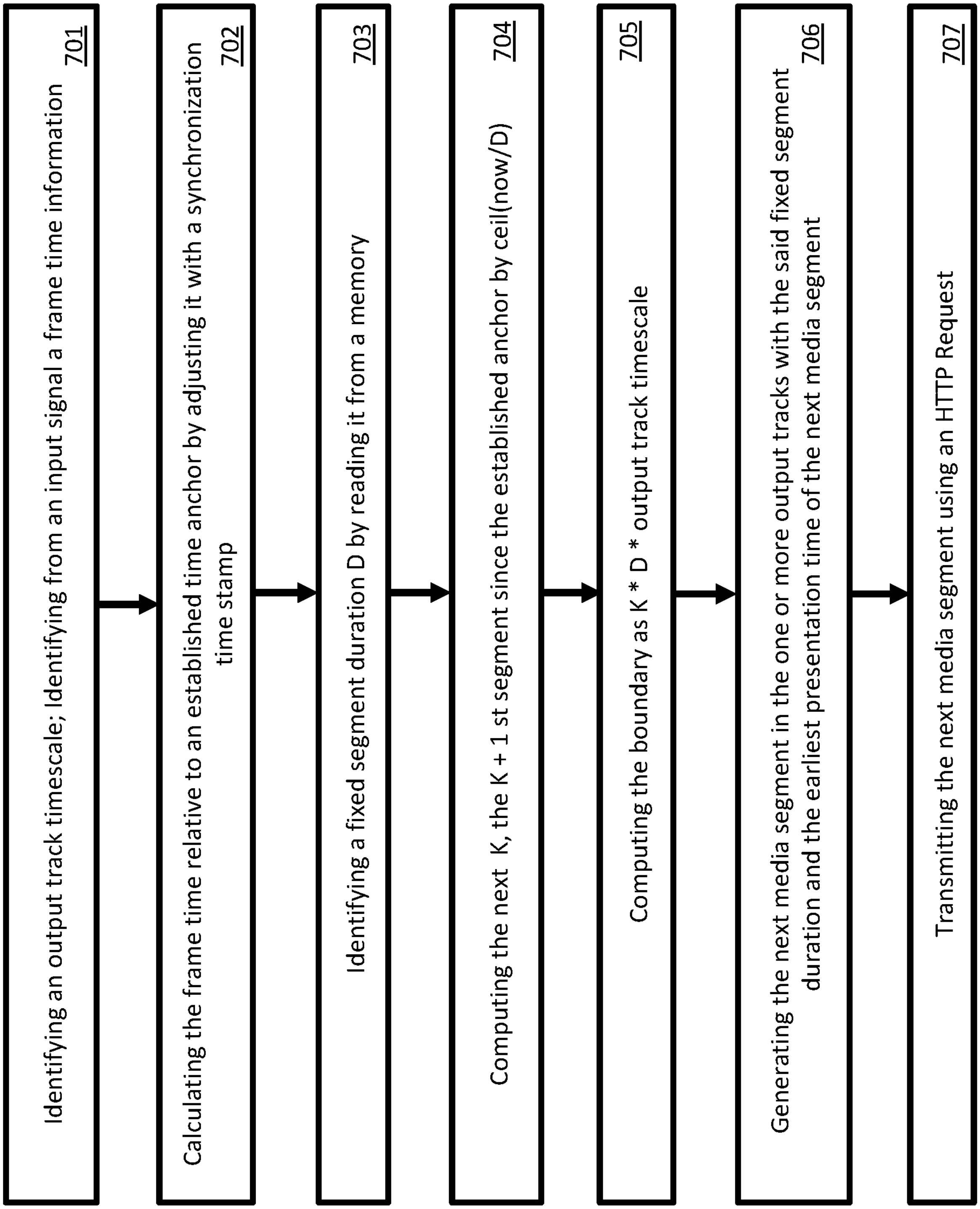
FIG. 7 illustrates the steps involved for distributed transcoder and packager output track synchronization in preferred embodiments.

FIG. 7. Illustrates the method 700 disclosed to implement the segment boundary and frame alignment. This method can be implemented using any known techniques using information processing system as described in FIG. 5, in preferred embodiments it can be implemented in an adaptive streaming transcoder or packager. In the first step 701 the input frame timestamp is identified from an input signal of input, using a previously step of identifying an output timescale. This first step comprises Identifying an output track timescale, in preferred embodiments, by reading it from a memory; Identifying from an input signal a frame time information and optionally adjusting it for the output track timescale. The next step 702 comprises calculating the frame time relative to an established time anchor by adjusting it with a synchronization time stamp. In preferred embodiments this established time anchor is based on Unix Epoch corresponding to 1-1-1970 00:00:00 GMT time, the synchronization time stamp is used to align time zero in the input to the established anchor, e.g. in case 1 2020 0):00:00 is the zero time in the input the synchronization timestamp would be the number of seconds since the established anchor at 1-1-2020. The next step 703 comprises identifying a fixed segment duration D by reading it from a memory. As disclosed in this document, this duration may be a configuration parameter set to the one or more adaptive streaming transcoders or packagers. The value would in most implementations be read from a memory such as a random access memory, as solid state drive (SSD) or a cache memory in the central processing unit. A next step (704 and 705) in the method comprises computing an earliest presentation time of a next media segment. In preferred embodiments is used on epoch segment synch as described by equations (1)-(3) as disclosed herein. The next step 706 in the method comprises generating the next media segment in the one or more output tracks with the said fixed segment duration and the earliest presentation time of the next media segment. In some embodiments, a well-known implementation of the transcoder or packager may be used to implement this step such as based on FFMpeg toolset library that support the output of the DASH-IF live media ingest protocol and adaptive streaming transcoding and packaging. The next step 707 in the method comprises transmitting the next media segment using an HTTP Request. In preferred embodiments this step is based on using HTTP requests based on HTTP POST or PUT method.

Figure 8:
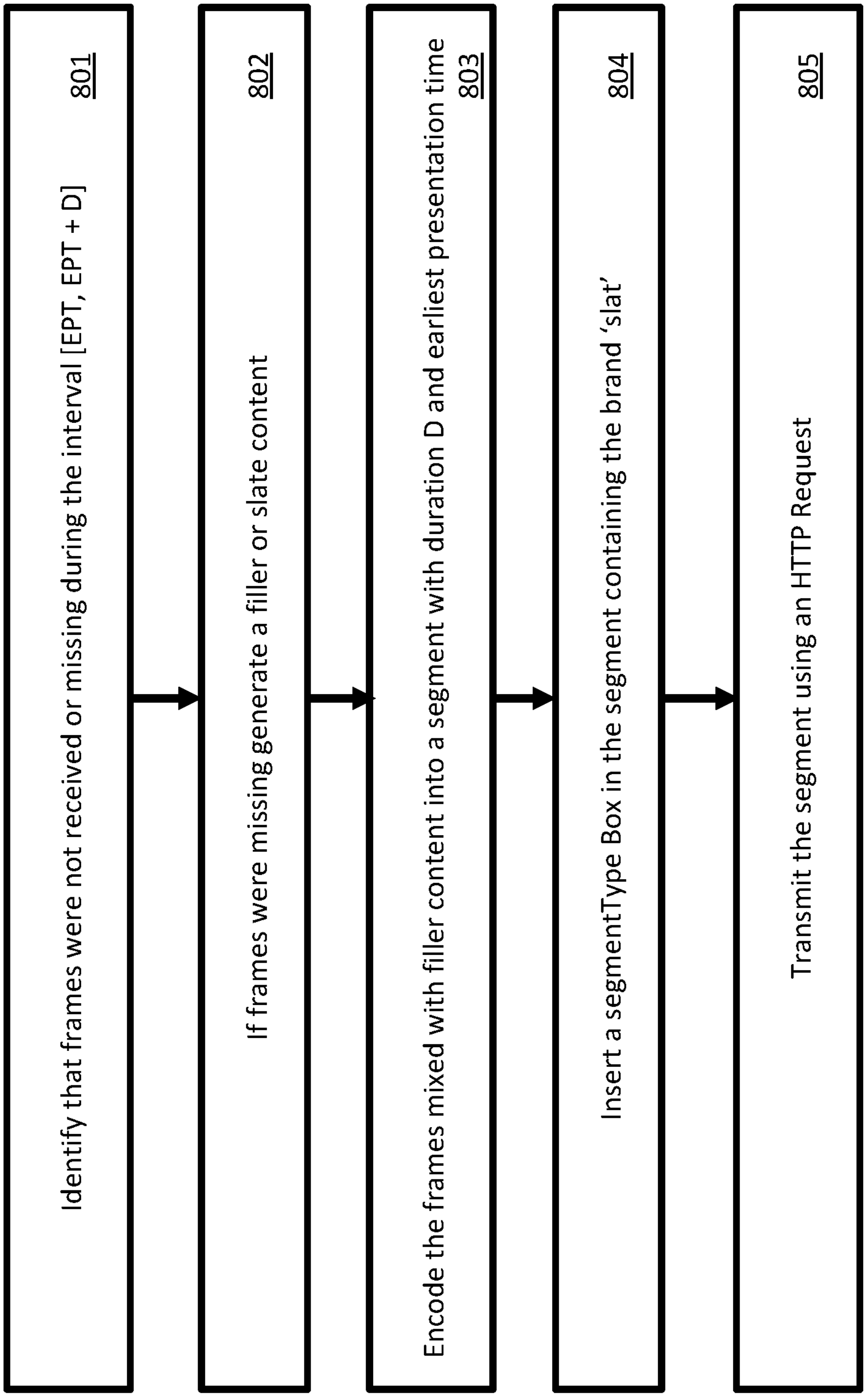
FIG. 8 illustrates the steps involved for distributed transcoder/packager output track synchronization in preferred embodiments.

FIG. 8. Illustrates the method 800 disclosed, for the case when one or more input frames were not received during the target segment duration interval. In this case the segment time interval ranges from the earliest presentation time of the media segment up to the earliest media presentation time plus D (the fixed media segment duration). The first step 801 of the method 800 includes identifying frames were not received or missing in the interval between earliest presentation time of the segment and the earliest presentation plus D. In a next step 802, a filler or slate content is generated, where a filler or slate content can be a video image or image sequence such as a moving animation or a black screen, or other content to fill the image. In the case of audio, silent frames may be inserted and generated in the media segment.

In the next step 803 all frames, both the frames received are encoded into a media segment. This step in the method 800 results in a media segment of duration D that is continuous and contains valid media samples in the entire interval spanning from EPT up to EPT+D. This frame is encoded using the same codec as other media segments, popular codecs including video codecs such as H.26X (4,5,6), MPEG-4 AAC, MPEG-H audio, Dolby ac-3, e-ac3 or ac4 and av1 or ays3 or other known codecs in existence that are commonly used by adaptive streaming transcoders.

The media segment generated will include a SegmentType (styp) Box as defined in ISO Base Media File format ISO IEC 14496-12 and will indicate the brand 'slat' as part of step 804 where this implies that the segment includes content that is not fully based on input. The downstream receiver can then later on replace the segment with a segment not containing a SegmentType (styp) box containing the slat brand.

To deal with missing input content in the method 800 involves a last step 805 of transmitting the segment using an HTTP Requests. For example, in preferred embodiments an HTTP request with a POST method may be used to transmit the media segments to the streaming server or other receiving entity. In another cases other HTTP methods such as HTTP PUT or GET may be used to transmit. The HTTP request may also be carried over TLS (transport layer security) in preferred embodiments. The steps comprising the method illustrated in FIG. 8. May be implemented in different orders and using different techniques known in adaptive streaming transcoder or other components using information processing system as illustrated in FIG. 5.

FIG. 9. Illustrates the steps included in a method 900 for generating an MPEG-DASH manifest to describe the output of adaptive streaming transcoders in preferred embodiments herein. The first step 901 includes writing an MPEG-DASH manifest with one or more SegmentTemplate Elements. The SegmentTemplate elements can each contain XML attributes @media, the @media attributes and a following step 902 would involve setting them to a value that includes the substring $RepresentationID$ and substring equivalent to $Time$ or $Number$. The method 900 also includes the step 903 of setting the attribute SegmentTemplate@initialization attribute to a value containing the substring $RepresentationID$. A next step 904 in the method 900 includes an additional step of setting the MPD@availabilityStartTime to fixed anchor date/time, and in preferred embodiments chosen to be the value of 1970-01-01T00:00:00Z or a semantically equivalent value, but other anchors may be used. The method 900 further includes a next step 905 of setting the Period@start to PTOs or a semantically equivalent value based on the ISO duration scheme. The method 900 may include the additional step 906 of transmitting the MPD by an HTTP Request, and in preferred embodiments using the POST or PUT method available in HTTP. In a subsequent step 907, one or more CMAF Headers or DASH initialization segments are transmitting using HTTP requests to URL/URI generated using the SegmentTemplate attributes @initialization. In the next step 908, generated media segments are transmitted using HTTP request to URL/URI resolved based on @media attributes.

FIG. 10. Illustrates an example MPEG-DASH manifest generated by the adaptive streaming transcoder in output for preferred embodiments. FIG. 10 shows the MPEG-DASH Manifest description with the embedded XML elements 1000, as disclosed in the embodiments. Period@start 1002 is set to PTOS or an equivalent value, the MPD@AvailabilityStartTime 1001 is set to 1970-01-01T00:00:00Z or a semantically equivalent value or an alternative anchor that was used. The SegmentTemplate 1003 element is also shown, where it contains the attributes @media and @initialization that each contain the substring $RepresentationID$, the @media attribute also contains the substring $Time$ or $Number$, the SegmentTimeline element need not contain entries, as the entries can be derived from the actual media segments. An example SegmentTimeline enclosed in the SegmentTemplate element can be used to signal announced media segments or segments that will be announced and transmitted 1004. The MPD may also signal the time server that is used to synchronize to and provide the time anchor, in this case time.akamai.com (1005) is used a commonly used time server that provides the time sample now, the number of seconds since epoch, any other time server or remote service providing such a timestamp maybe used.

FIG. 11. Illustrates exemplary common media application format or MPEG-DASH or fmp4 HTTP live streaming segments 1100. The segments may contain the segmentType box 1101 optionally containing the 'slat' brand in the compatible_brands list. In case this brand is present a receiving entity such as the streaming origin server may decide to swap this segment with a segment with identical timing information from another adaptive streaming encoder that does not contain such brand and did not experience a lack of input. The media segment contains the MovieFragment Box 'moof' 1102 containing a traf box 1103 and a TrackFragmentDecodeTime Box 'tfdt' box containing the baseMediaDecodeTime which is set to K*D*segmenttimescale 1104.

The segment sequences continuous media segments with increasing baseMediaDecodeTime (K+1)*D*segmenttimescale and (K+2)*segmenttimescale etc.

As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a result listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

FIG. 5 shows the various embodiments can be further implemented in a wide variety of operating environments in an information processing system, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Various embodiments of the present disclosure can be implemented on an information processing system. The information processing system is capable of implementing and/or performing any of the functionality set forth above. Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, microprocessor-based systems, set top boxes, programmable consumer electronics, network PCs, minicomputer systems, mainframe computer systems, Internet-enabled television, and distributed cloud computing environments that include any of the above systems or devices, and the like. The information processing systems contemplated herein include media streaming devices such as smart televisions, tablet computers, personal computers, media streaming servers, content delivery networks or other components with similar functionality for transmitting, receiving and processing of media streaming content. The media streaming device can also include a parser device which can include a device such as a file reader, java-script based parser, that can extract the ISO Base Media file Format structures to read them into the computer memory and use them for generating instructions for the processor. Again, a media streaming device as contemplated in various embodiments herein can be any device dealing with streaming media either actively or passively. They could be origin servers or packagers that are used for formatting live encoded media, or alternatively embedded in devices such as smart phones, televisions, ipads, or other consumer electronics receiving the track for rendering the media presentation, TV Channel or any other associated media tracks. As noted previously, the data processing can be any number of data processing techniques suited for the identifying, enclosing, storing, transmitting, receiving, formatting, converting, multiplexing, de-multiplexing, slicing, presenting, providing controlled access or authentication, tracking, logging or counting or any other function contemplated herein in any setting or environment.

For example, a user with a mobile device may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols assuming the networks have the appropriate bandwidth to present data or real time images. Alternatively, the display system can be a computing and monitoring system with or without wireless communications as the case may be.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described above.

According to yet another embodiment of the present disclosure, a computer readable storage medium comprises computer instructions which, responsive to being executed by one or more processors, cause the one or more processors to perform operations as described in the methods or systems above or elsewhere herein.

FIG. 5 shows an information processing system 501 of a system 200 or 500 can be communicatively coupled with the data processing module 550 and a group of client or other devices, or coupled to a presentation device for display at any location at a terminal or server location. According to this example, at least one processor 502, responsive to executing instructions 507, performs operations to communicate with the processing module 550 via a bus architecture 508, as shown. The at least one processor 502 is communicatively coupled with main memory 504, persistent memory 506, and a computer readable medium 520. The processor 502 is communicatively coupled with an Analysis & Data Storage 515 that, according to various implementations, can maintain stored information used by, for example, the data processing module 550 and more generally used by the information processing system 200 or 500. The data processing module 550 can be coupled to one or more sensors 552 as needed. Such sensors can be timers, barcode scanners, fingerprint readers, proximity sensors, microphones, cameras, video cameras, location sensors, motion detectors, biometric reading devices (e.g., iris scanners, facial recognition scanners, voice detection devices) and other devices as contemplated herein. Optionally, this stored information can be received from the client or other devices. For example, this stored information can be received periodically from the client devices and updated or processed over time in the Analysis & Data Storage 515. Additionally, according to another example, a history log can be maintained or stored in the Analysis & Data Storage 515 of the information processed over time. The data processing module 550, and the information processing system 500, can use the information from the history log such as in the analysis process and in making decisions related methods disclosed herein.

The computer readable medium 520, according to the present example, can be communicatively coupled with a reader/writer device (not shown) that is communicatively coupled via the bus architecture 508 with the at least one processor 502. The instructions 507, which can include instructions, configuration parameters, and data, may be stored in the computer readable medium 520, the main memory 504, the persistent memory 506, and in the processor's internal memory such as cache memory and registers, as shown.

The information processing system 500 includes a user interface (or interfaces) 510 that comprises a user output interface 512 and user input interface 514. Examples of elements of the user output interface 512 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 514 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 502 to receive user input data and commands, or to receive test data for example.

A network interface device 516 is communicatively coupled with the at least one processor 502 and provides a communication interface for the information processing system 500 to communicate via one or more networks 302. The networks 302 can include wired and wireless networks, and can be any of local area networks, wide area networks, or a combination of such networks. For example, wide area networks including the internet and the web can intercommunicate the information processing system 500 with other one or more information processing systems that may be locally, or remotely, located relative to the information processing system 500. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 516 can provide a communication interface for the information processing system 500 to access the at least one database 517 according to various embodiments of the disclosure.

The instructions 507, according to the present example, can include instructions for monitoring, instructions for analyzing, instructions for retrieving and sending information and related configuration parameters and data. It should be noted that any portion of the instructions 507 can be stored in a centralized information processing system or can be stored in a distributed information processing system, i.e., with portions of the system distributed and communicatively coupled together over one or more communication links or networks.

What is claimed is:

1. A method for synchronizing one or more output tracks, the one or more output tracks comprising one or more media segments, the method, comprising:

identifying an output track timescale;

identifying from an input signal a frame time information;

calculating the frame time relative to an established time anchor by adjusting the frame time with a synchronization time stamp;

identifying a fixed segment duration by reading the fixed segment duration from a memory;

computing an earliest presentation time of a next media segment, wherein the earliest presentation time of the next media segment is computed by an integer K times the fixed segment duration times the output track timescale, wherein the integer K for the next media segment is calculated as the current time relative to the established time anchor divided by the fixed segment duration rounded to a nearest upward integer;

generating the next media segment in the one or more output tracks with the fixed segment duration and the earliest presentation time of the next media segment;

transmitting the next media segment using an HTTP Request.

2. The method of claim 1, wherein calculating the frame time relative to the established time anchor by adjusting the frame time with the synchronization time stamp is preceded by identifying the input timescale from the input signal, and when the input timescale is different from the output track timescale adjusting the frame time information for the output track timescale.

3. The method of claim 1, wherein the one or more output tracks are represented in the Common Media Application format and represent one or more different qualities and bit-rates to enable seamless switching.

4. The method of claim 1, wherein the step of identifying from the input signal the frame time information, is preceded by a step of generating the frame time information based on a frame time alignment or a synchronization method.

5. The method of claim 1, the method further comprising:

identifying missing frame information from the input signal; and in case missing frame information is identified, generating the next media segment with the fixed segment duration and the earliest presentation time of the next media segment also comprising inserting a SegmentTypeBox in the media Segment.

6. The method of claim 1, the method further comprising:

identifying a SCTE-35 marker in the input signal;

in case the SCTE-35 marker is identified, generating the next media segment with the fixed segment duration and the earliest presentation time of the next media segment also comprising inserting an IDR frame at a presentation time corresponding to the time signaled by the SCTE-35 marker.

7. The method of claim 1, the method further comprising generating an MPEG-DASH manifest for describing the one or more output tracks and enabling a synchronized presentation of the one or more output tracks from one or more distributed adaptive streaming transcoders or packagers.

8. The method of claim 6, the method further comprising setting MPEG-DASH manifest @availabilityStartTime to "1970-01-01T00:00:00Z" or a semantically equivalent value and the Period@start of OPTS or a semantically equivalent value.

9. The method of claim 1, the method further comprising setting the sequence_number field of the MediaFragmentHeaderBox (mfhd) to a continuously increasing integer number K.

10. The method of claim 1, the method further comprising setting the baseMediaDecodeTime of the TrackFragmentDecodeTime (tfdt) to the earliest presentation time based on the output track timescale.

11. The method of claim 1, wherein the step of identifying from the input signal the frame time information comprises the step of checking for timestamp wraparound or overflow and further adjusting the output frame time when detecting timestamp wraparound or overflow.

12. The method of claim 1, wherein the step of transmitting the next media segment using the HTTP Request uses an HTTP POST or PUT method.

13. A method for synchronizing one or more output tracks, the one or more output tracks comprising one or more media segments, the method, comprising:

identifying an output track timescale;

identifying from an input signal a frame time information;

calculating the frame time relative to an established time anchor by adjusting the frame time with a synchronization time stamp;

identifying a fixed segment duration by reading the fixed segment duration from a memory;

computing an earliest presentation time of a next media segment, wherein the step of computing an earliest presentation time of the next media segment is based on a synchronization method;

generating the next media segment in the one or more output tracks with the fixed segment duration and the earliest presentation time of the next media segment;

transmitting the next media segment using an HTTP Request, wherein the step of transmitting the next media segment is preceded by identifying if the next media segment is the first media segment or if an HTTP error code was received; and further comprising transmitting an initialization segment or CMAF Header using an HTTP Request before transmitting the next media segment.

14. A system for synchronizing one or more output tracks from one or more distributed adaptive streaming transcoders or packagers, the system comprising:

a plurality of distributed transcoders having one or more processors and memory having computer instructions which when executed by the one or more processors cause the one or more processor to perform the functions of:

identifying the output track timescale;

identifying from an input signal a frame time information;

calculating the frame time information of the frame relative to a time anchor by adjusting it with a synchronization time stamp;

identifying a fixed segment duration by reading the fixed segment duration from a memory;

computing an earliest presentation time of a next media segment as an integer multiple of D times the output track timescale, wherein the earliest presentation time of the next media segment is computed by an integer K times the fixed segment duration times the output track timescale, wherein the integer K for the next media segment is calculated as the current time relative to the established time anchor divided by the fixed segment duration rounded to a nearest upward integer;

generating the next media segment with the fixed segment duration D and the earliest presentation time of the next media segment;

transmitting the next media segment using an HTTP Request or a receiver.

15. The system of claim 14, wherein one or more distributed adaptive streaming transcoders or packagers are deployed on geographically distributed locations.

16. The system of claim 14, wherein the distributed adaptive streaming transcoders or packagers run in parallel.

17. The system of claim 14, wherein the receiver comprises a streaming origin server that combines packager and origin functions and further comprises a content delivery network coupled to a digital rights management system.

18. The system of claim 14, wherein the system forms a part of a cloud-based services system.

* * * * *